United States Patent

Pihl et al.

[11] Patent Number: 5,491,025
[45] Date of Patent: Feb. 13, 1996

[54] ABRASIVE FILAMENTS COMPRISING ABRASIVE-FILLED THERMOPLASTIC ELASTOMER

[75] Inventors: Richard M. Pihl, Cottage Grove, Minn.; Duane J. Hayes, Ellsworth, Wis.; Loren L. Barber, Jr., Lake Elmo, Minn.; Dennis G. Welygan, Woodbury, Minn.; R. Eugene Hardwick, Maplewood, Minn.; Ronald O. Zemke, deceased, late of White Bear Lake, Minn., by Joy D. Zemke, legal representative

[73] Assignee: Minnesota Mining and Manufacturing Company, St. Paul, Minn.

[21] Appl. No.: 440,749

[22] Filed: May 15, 1995

Related U.S. Application Data

[62] Division of Ser. No. 351,884, Dec. 8, 1994, Pat. No. 5,443,906, which is a continuation of Ser. No. 65,864, May 21, 1993, abandoned, which is a continuation of Ser. No. 854,330, Mar. 19, 1992, abandoned.

[51] Int. Cl.$^6$ ............................................. D07G 3/00
[52] U.S. Cl. ..................... 428/373; 428/374; 428/372; 428/370; 51/298; 51/299; 528/76
[58] Field of Search .................... 428/373, 374, 428/370, 384, 372; 51/298, 299; 528/76, 83

[56] References Cited

U.S. PATENT DOCUMENTS

| | | | |
|---|---|---|---|
| 2,328,998 | 9/1943 | Radford | 51/185 |
| 2,643,945 | 6/1953 | Buckner | 51/297 |
| 2,682,734 | 7/1954 | Peterson | 51/190 |
| 2,793,478 | 5/1957 | Rohowetz | 51/188 |
| 2,826,776 | 3/1958 | Peterson | 15/179 |
| 2,845,648 | 8/1958 | Peterson | 15/159 |

(List continued on next page.)

FOREIGN PATENT DOCUMENTS

| | | |
|---|---|---|
| 0282243 | of 1988 | European Pat. Off. . |
| 0513798 | of 1992 | European Pat. Off. . |
| 2624773 | of 1989 | France . |
| 53-004280 | 3/1978 | Japan . |
| 56-157956 | 3/1982 | Japan . |
| 60/252715 | 12/1985 | Japan .................. D01F 6/92 |
| 60/21376 | 12/1985 | Japan .................. D01F 6/92 |
| 61-257777 | 10/1986 | Japan . |
| 61-260977 | 4/1987 | Japan . |
| 61-090877 | 9/1987 | Japan . |
| 63-147622 | 10/1988 | Japan . |

OTHER PUBLICATIONS

Watts, J. H., "Abrasive Monofilaments–Critical Factors That Affect Brush Tool Performance", Society of Manufacturing Engineers Technical Paper, 1988.

*Thermoplastic Elastomers, A Comprehensive Review*, edited by N. R. Legge, G. Holden, and H. E. Schroeder, Hanswer Publishers, N.Y. 1987.

Design News, May 22, 1989, p. 40.

R. D. Lundberg, "Ionic Polymers", *Encyclopedia of Polymer Technology*, vol. 8, 1985, pp. 393–423.

H. Schroeder and R. J. Cella, "Elastic Polyesters", *Encyclopedia of Polymer Technology*, vol. 12, 1985, pp. 75–117.

N. R. Legge, "Thermoplastic Elastomers—The Future", *Elastomerics*, Oct. 1985.

(List continued on next page.)

*Primary Examiner*—N. Edwards
*Attorney, Agent, or Firm*—Gary L. Griswold; Walter N. Kirn; Doreen S. L. Gwin

[57] ABSTRACT

An abrasive filament, including a thermoplastic elastomer having abrasive particles dispersed and adhered therein, exhibits improved life over previously known abrasive-filled polymeric filaments. Methods of making abrasive filaments of the invention, articles including the abrasive filaments, and methods of abrading surfaces using the abrasive articles of the invention are also described.

21 Claims, 4 Drawing Sheets

U.S. PATENT DOCUMENTS

| | | | |
|---|---|---|---|
| 2,878,048 | 3/1959 | Peterson | 288/2 |
| 2,920,947 | 1/1960 | Burk et al. | 51/298 |
| 2,984,053 | 5/1961 | Peterson | 51/193.5 |
| 3,016,554 | 1/1962 | Peterson | 15/159 |
| 3,076,219 | 2/1963 | Peterson | 15/179 |
| 3,090,061 | 5/1963 | Charvat | 15/159 |
| 3,134,122 | 5/1964 | Charvat | 15/179 |
| 3,146,560 | 9/1964 | Hurst | 51/188 |
| 3,260,582 | 7/1966 | Zimmer, Jr. et al. | 51/293 |
| 3,522,342 | 7/1970 | Nungesser et al. | 264/210 |
| 3,547,608 | 12/1970 | Kitazawa | 51/294 |
| 3,554,974 | 1/1971 | Mommaerts et al. | 260/72 |
| 3,645,976 | 2/1972 | Suzuki et al. | 260/75 NH |
| 3,669,850 | 6/1972 | Draca | 264/16 |
| 3,669,934 | 6/1972 | Epstein et al. | 260/77.5 SP |
| 3,679,633 | 7/1972 | Matsubayashi et al. | 260/75 NE |
| 3,696,563 | 10/1972 | Rands | 51/332 |
| 3,781,172 | 12/1973 | Pett et al. | 51/309 |
| 3,854,898 | 12/1974 | Whitney, Jr. et al. | 51/295 |
| 3,891,408 | 6/1975 | Rowse et al. | 51/295 |
| 3,893,826 | 7/1975 | Quinan et al. | 51/295 |
| 3,974,169 | 3/1976 | Wolff et al. | 425/71 |
| 4,097,246 | 6/1978 | Olson | 51/309 |
| 4,172,440 | 10/1979 | Schneider et al. | 125/18 |
| 4,314,827 | 2/1982 | Leitheiser et al. | 51/298 |
| 4,456,654 | 6/1984 | Kotian | 428/383 |
| 4,469,738 | 9/1984 | Himelreich, Jr. | 428/198 |
| 4,469,739 | 9/1984 | Gretzinger et al. | 428/198 |
| 4,505,720 | 3/1985 | Gabor et al. | 51/295 |
| 4,507,361 | 3/1985 | Twilley et al. | 428/373 |
| 4,518,397 | 5/1985 | Leitheiser et al. | 51/293 |
| 4,574,003 | 3/1986 | Gerk | 51/309 |
| 4,585,464 | 4/1986 | Haylock et al. | 51/298 |
| 4,612,241 | 9/1986 | Howard, Jr. | 428/294 |
| 4,627,950 | 12/1986 | Matsui et al. | 264/103 |
| 4,652,275 | 3/1987 | Bloecher et al. | 51/298 |
| 4,744,802 | 5/1988 | Schwabel | 51/309 |
| 4,770,671 | 9/1988 | Monroe et al. | 51/293 |
| 4,799,939 | 1/1989 | Bloecher et al. | 51/293 |
| 4,866,888 | 9/1989 | Mural et al. | 51/401 |
| 4,881,951 | 11/1989 | Wood et al. | 51/309 |
| 4,945,687 | 8/1990 | Scheider et al. | 51/394 |
| 5,049,597 | 9/1991 | Howard, Jr. | 523/457 |
| 5,068,142 | 11/1991 | Nose et al. | 428/232 |
| 5,082,720 | 1/1992 | Hayes | 428/224 |
| 5,100,992 | 3/1992 | Cohn et al. | 528/26 |
| 5,111,032 | 5/1992 | Batliwalla et al. | 219/549 |

OTHER PUBLICATIONS

C. P. Rader and J. H. Muhs, "Thermoplastic Elastomers—Introduction to TPEs", *Modern Plastics*, Mid–Oct. 1989 Encyclopedia Issue, pp. 122–132.

Product Literature: 3M "Brushion Products, Belts, Wheels, Discs, Rolls & Cyclinder Brushes", Brochure No.: 60–440–0387–3(653)K, 1983.

Society of Manufacturing Engineers, Developing and Emerging Trends in Brushing and Buffing, Scheider, MR83–682, 1983.

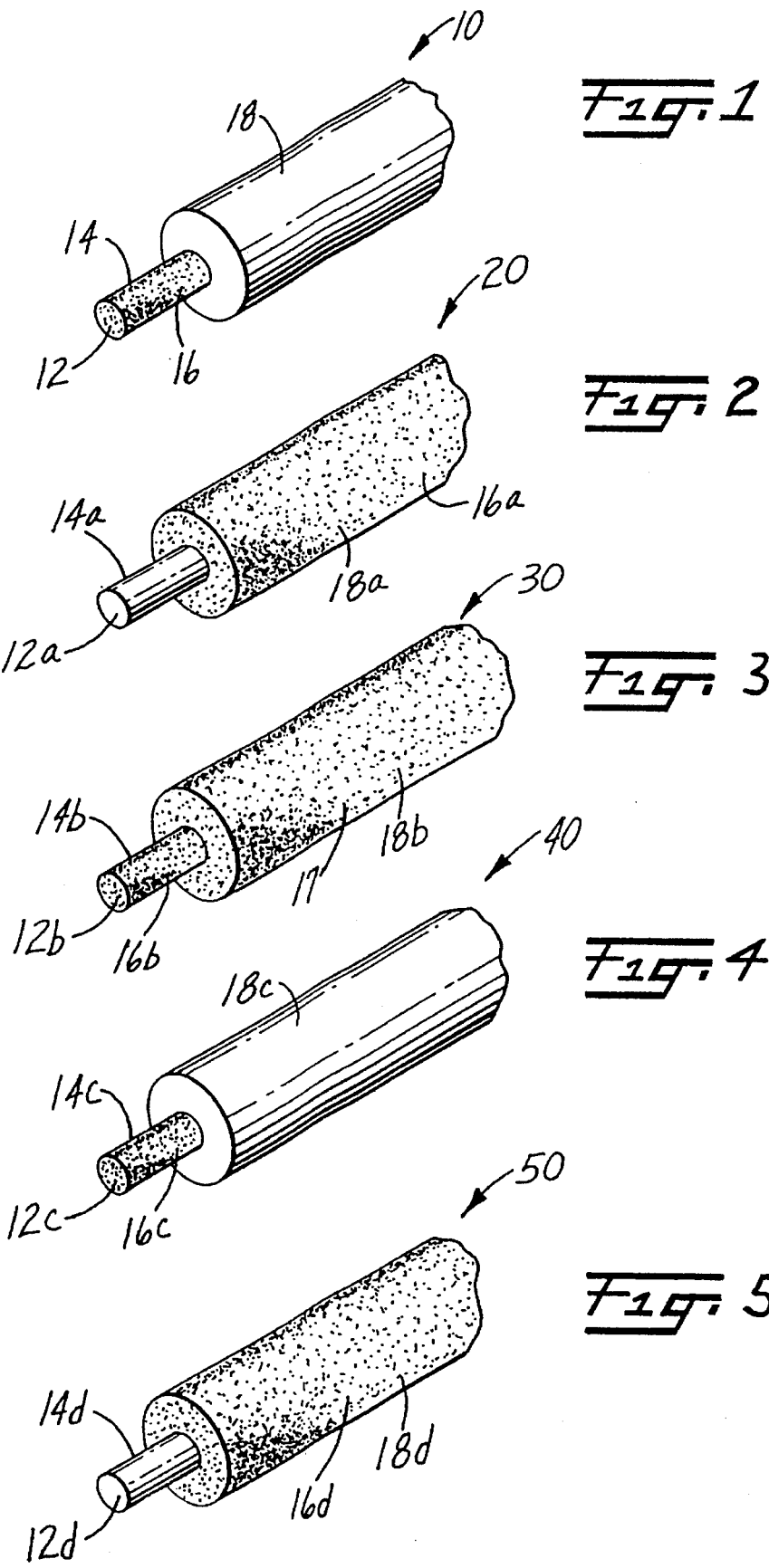

ABRASIVE FILAMENTS COMPRISING ABRASIVE-FILLED THERMOPLASTIC ELASTOMER

This is a division of application Ser. No. 08/351,884, filed Dec. 8, 1994, now U.S. Pat. No. 5,443,906, which is a continuation of application Ser. No. 08/065,864, filed May 21, 1993, now abandoned, which is a continuation of application Ser. No. 07/854,330, filed Mar. 19, 1992, now abandoned.

CROSS-REFERENCE TO RELATED APPLICATIONS

This application is related to assignee's copending application Ser. No. 07/853,799, filed Mar. 19, 1992.

TECHNICAL FIELD

The present invention relates to abrasive filaments comprising at least one layer component which includes an abrasive-filled thermoplastic elastomer.

BACKGROUND ART

Abrasive-filled nylon filaments were developed in the late 1950's as a man made alternative to natural abrasive filaments. At about that time an extrusion process was developed for dispersing abrasive particles uniformly in a nylon matrix in the form of a filament (U.S. Pat. Nos. 3,522,342 and 3,947,169). A review of nylon abrasive filaments is presented by Watts, J. H., "Abrasive Monofilaments-Critical Factors that Affect Brush Tool Performance", Society of Manufacturing Engineers Technical Paper, 1988, a written version of a presentation by the author at the WESTEC Conference, held Mar. 21–24, 1988. As explained by Watts, as filaments of this type wear, new abrasive particles are exposed. An abrasive filament brush tool made using a plurality of these filaments is thus regenerated during use. Some of the advantages of nylon abrasive filaments are their safety, cleanliness, cutting speed, low cost, superior radius and finish control, adaptability, and ease in design.

A key property of nylon and other thermoplastic materials is its "memory". In a brush filament this is referred to in the art as "bend recovery", or the tendency for a deflected filament to return to its original deployment. The bend recovery for nylon is generally over 90%, i.e., the filament returns to about 90% of its original deployment after being deflected.

Over time in operation, such as in a brush tool, most abrasive-filled polymeric filaments will take a set shape, and unless the filaments of the brush tool recover, the brush tool becomes soft and loses its effectiveness. Bend recovery is determined by filament diameter, relaxation time, strain, deflection time, and environmental conditions. Among synthetic filaments made to date, nylon offers the best bend recovery from strain held for an extended period of time.

While adequate for many purposes, the inventors herein have found that the various abrasive-filled nylon filaments have property limitations which make their use less than optimal as abrasive filaments. Abrasive-filled nylon filaments have limited stiffness and may lose their stiffness as filament temperature approaches 70° C., and thus may not be suitable for removing heavy scale or burrs when elevated filament temperatures are developed. Temperature resistance is critical in maintaining filament stiffness. Elevated temperatures generally affect all abrasive-filled nylon filaments in a similar way: stiffness, as measured by the bending (tangent) modulus, decreases as temperature increases. Heat generation is normally not a problem in long filament deburring where brush tool speeds are low. However, in short trim power brushes, tool pressure on the part and/or high speed in a dry environment can generate high temperatures at the filament tips.

Another limitation of abrasive-filled nylon filaments is that moisture from any source can have a noticeable affect on brush tool performance of brush tools incorporating them. Moisture affects filament stiffness and thereby tool aggressiveness. Nylon 6,12 retains stiffness better than other nylon materials and is 2–3 times stiffer than other types of nylon in high humidity or when saturated with oils, solvents or when water is present.

In most abrasive-filled polymeric filaments, as the degree of abrasive loading increases, the tensile strength and flex fatigue resistance tend to decrease, due to insufficient binding of abrasive and polymer. Bending modulus for a filament can be simply defined as the resistance to bending. This is an inherent characteristic of the polymer used for the abrasive filament. Bending modulus is generally independent of the filament diameter, and since the bending modulus of a family of abrasive filaments made from the same polymer will be the same, the main characteristics which affect filament stiffness are the diameter and length of the filament.

The abrasive cutting ability of abrasive-filled nylon filaments exhibits the distinct characteristic of cutting relatively well at the onset of the operation, followed by clear loss of abrasive action within about 1 hour. FIG. 7 shows the degradation in cutting ability of abrasive-filled nylon filaments, filled with a typical aluminum oxide abrasive, when the filaments are attached to a hub to form a brush and the hub rotated so that the filaments strike a stationary workpiece. FIG. 7 represents the cut obtained on a cold rolled steel (1018) plate as a function of time at a constant load of 1.36 Kg. Equipment is typically designed to reverse the brush operation to restore the abrasive action to its original level of activity. An abrupt increase in cut can be achieved if the brush is "dressed", for example by operating the brush against a wire screen. This is shown at 2 hours 15 minutes in FIG. 7.

Another problem associated with abrasive-filled nylon filaments is their poor flex fatigue resistance. Over extended periods of operation the filaments tend to break near the point of attachment to the hub, an inconvenience to the user, resulting in decreased life and economic value of the brush.

The present invention addresses some of the problems mentioned above with abrasive-filled nylon and other filaments by presenting an abrasive filament comprising a thermoplastic elastomer having abrasive particles dispersed and adhered therein.

Abrasive filament embodiments within the invention having first and second components, as described in greater detail below, may have abrasive particles in one or more elongate filament components. These abrasive filaments are to be distinguished structurally from composite abrasive filaments comprising a "preformed" core at least partially coated with a coating of abrasive-filled thermoplastic elastomer. In the latter, the preformed core and coating have markedly different mechanical properties, such as tensile strength. (Composite abrasive filaments are the subject of assignee's co-pending application Ser. No. 07/853,799, filed Mar. 19, 1992, entitled "Composite Abrasive Filaments, Methods of Making Same, Articles Incorporating Same, and Methods of Using Said Articles") Tensile strength may be significantly higher in composite abrasive filaments due to the tensile strength of the preformed core.

Experimentation with and production of abrasive filaments has a long history. U.S. Pat. No. 2,328,998, Radford, discloses abrasive tools made from monofilaments containing abrasive particles either throughout the filament or in the sheath or core of a sheath-core structure. The filament may be made of cellulose ester, resins, or thermoplastic polymers (for example, nylon). The use of thermoplastic elastomers is not taught or suggested.

U.S. Pat. No. 2,643,945, Buckner, describes a device wherein a cotton cord is coated with abrasive grains using a furfuryl resin and then wound convolutely onto a core to produce a grinding or cut-off wheel.

U.S. Pat. No. 2,793,478, Rohowetz, describes abrasive filaments comprising a core consisting of a single strand or twisted, woven group of strands of metal, glass, or synthetic polymer, with a layer of flexible thermosetting resinous material permanently bonded to the core, and particles of abrasive material permanently embedded in the resinous material. A second embodiment describes a core, a layer of thermoplastic adhesive, a layer of thermosetting resin permanently bonded to the thermoplastic layer, with abrasive grains permanently embedded in the thermosetting layer. The use of thermoplastic elastomers is not taught or suggested.

U.S. Pat. No. 2,920,947, Burk et al., describes a core-sheath composition of a linear polyamide bristle having a surface coating of synthetic linear polyamide in which exposed solid abrasive particles are embedded, the particles being held in position by adhesion. A method for preparation is also presented which comprises coating a bristle with an aqueous dispersion of linear polyamide containing 5–50% abrasive, and drying the coating above 100° C.

U.S. Pat. No. 3,146,560, Hurst, describes abrasive filaments comprising preformed synthetic filaments coated with a binder containing abrasive particles. The abrasive coated filaments are used to make abrasive articles. The synthetic filaments are typically a plurality of strands, each of which is formed from glass fibers that are twisted together. The binder is preferably a phenolic resin but can also include animal glue, compounded neoprene, and the like, or a synthetic resin such as resorcinol-formaldehyde resin or an aniline-formaldehyde, polyester, silane, epoxy or polyurethane resin. The use of thermoplastic elastomer binders is not taught or suggested.

U.S. Pat. No. 3,260,582, Zimmer et al. describes nonwoven polishing and abrading pads formed using long, continuous filaments of preformed and crimped synthetic cores coated with abrasives and abrasive grains. Preferred preformed cores are polyamides, such as nylon or polyester filaments. Other preformed cores disclosed are those capable of being thermoformed including the vinylidenes, olefins, fluorocarbons, acrylonitriles and acrylics. Adhesives may vary from the elastomeric to the hard, heat-advancing resinous type such as the polyurethane or phenol-aldehyde based adhesives. Again, the use of thermoplastic elastomers is not suggested.

U.S. Pat. No. 3,522,342, Nungesser et al., (mentioned above) describes apparatus and methods for making abrasive bristles having an abrasive filler, the apparatus utilizing two extruders. The method comprises melting a thermoplastic material in a first extruder and adding the abrasive filler to the molten thermoplastic through a second extruder, and extruding the mixture through a die which directs the output into a cooling water bath. Typical thermoplastic materials disclosed as useful include the nylons, propylene, polycarbonate, acetals, acrylics, polyethylene, polyurethane, polyvinylchloride, and combinations of nylon and a polyester, etc. The use of thermoplastic elastomers is not taught or suggested.

U.S. Pat. No. 3,547,608, Kitazawa, describes a method of manufacturing an impregnated fibrous grinding article, the method comprising feeding abrasive particles and a thermosetting resinous binder into the center of a rotary woven yarn while the yarn is rotary driven. After curing the binder, the composite is formed into a grinding article.

U.S. Pat. No. 4,172,440, Schneider et al., describes cutting filaments consisting of a linear monofilament of PET polyester into which from 0.3–10% by weight of an abrasive is incorporated. In the cutting process the abrasive particles are apparently not ripped off, as sometimes happens with steel wire cores bearing an abrasive on their surface, but the abrasive particles are said to be pressed into the monofilament.

U.S. Pat. No. 4,507,361, Twilley et al., describes low moisture absorption bristles of nylon and polyester. The bristles have a diameter of about 0.05– 0.23 cm and are composed of about 10–30 wt. % polyamide based on total thermoplastic weight. The polyamide preferably has less than about 35% of its end groups being amine groups. The balance of the thermoplastic weight comprises polyethylene terephthalate having an intrinsic viscosity of at least 0.60. About 5 to about 50 wt. % of abrasive filler is included in each bristle.

U.S. Pat. No. 4,627,950, Matsui et al., describes a method of making a conjugate fiber comprising at least one layer composed of a polymer containing at least 20% by weight of abrasive particles and at least one coating layer substantially covering the abrasive layer. The coating layer is composed of a polymer containing substantially no abrasive particles. At least part of the coating layer apparently must be removed from the conjugate fiber (prior to its use as an abrasive filament) with a solvent to expose at least a part of the abrasive layer. Typical polymer coating layers include PET and nylon 6.

U.S. Pat. No. 4,585,464, Haylock et al., describes a low moisture absorption abrasive bristle of polybutylene terephthalate. The thermoplastic matrix comprising polybutylene terephthalate contains an abrasive filler and the bristles are made by the process of U.S. Pat. No. 3,522,342, mentioned above. The bristles are preferably stretched 2–4 times for optimal tensile modulus and bend recovery.

U.S. Pat. No. 4,866,888, Murai et al., describes a wire encrusted with abrasive grains, produced by preparing a cylindrical metallic body having a metallic rod inserted into the central part of a metallic pipe, with a gap formed between the rod and the pipe, then filling the gap with a mixed powder comprising a metallic powder and abrasive grains. This structure is then hot and cold worked before removing the above-mentioned outermost metallic pipe.

U.S. Pat. No. 5,068,142, Nose et al., describes a fiber-reinforced polymeric resin composite material comprising a thermoplastic polymeric resin matrix which impregnates and covers a number of individual reinforcing fibers. Thermoplastics include nylon 6, nylon 66, polyolefins, polyesters, and others, while reinforcing fibers include carbon, glass, aramid, stainless steels, copper, and amorphous metal fibers. The composites do not contain abrasive material.

U.S. Pat. No. 5,082,720 (Hayes) describes melt-bondable, bicomponent fibers suitable for use in nonwoven abrasive articles, the fibers having as a first component a polymer capable of forming fibers and as a second component a compatible blend of polymers capable of adhering to the surface of the first component.

French Patent Application No. 2,624,773, published Jun. 23, 1989, Ferrant et al., describes an abrasive wire consisting of a core made up of a man-made fiber such as an aramid fiber which acts as the strength member of the fiber. The core is then covered with an abrasive material that is held in place by a thermosetting resin binding agent that has been previously applied. The surface is then wrapped with a binding thread and a second coating of abrasive material is applied.

European Patent Application No. 0 282 243, published Sep. 14, 1988, Susa et al., describes abrasive filaments made of a composition which comprises 95–70 volume percent of a polyvinylidene fluoride resin, whose inherent viscosity ranges from 0.9 to 1.4, and 5–30 volume percent of abrasive grains. The abrasive filaments are produced by melt-spinning the composition and then stretching the resulting filaments at a draw ratio of 2.5 times–5.5 times within a temperature range of 100°–200° C.

Other patents of interest include U.S. Pat. Nos. 2,643,945; 3,669,850; 3,696,563; 3,854,898; and 4,097,246. It should be clear at this point that Applicant does not contend that he has been the first to incorporate abrasive grains into a plastic or resinous filament. It should also be clear that there is a distinction between a core-sheath arrangement and a preformed core coated with a plastic material filled with abrasive grains. The present invention is concerned with abrasive filaments comprising at least one elongate filament component comprising abrasive-filled thermoplastic elastomer compositions, which have the unexpected property of exhibiting much higher abrasion efficiency (weight of workpiece removed per weight of filament lost) and many times the flex fatigue life compared to previously known abrasive filaments. Much higher levels of abrasive action were observed than would have been expected.

Thermoplastic elastomers are defined and reviewed in *Thermoplastic Elastomers, A Comprehensive Review*, edited by N. R. Legge, G. Holden and H. E. Schroeder, Hanser Publishers, New York, 1987 (referred to herein as "Legge et al", portions of which are incorporated by reference hereinbelow). Thermoplastic elastomers (as defined by Legge et al. and used herein) are generally the reaction product of a low equivalent weight polyfunctional monomer and a high equivalent weight polyfunctional monomer, wherein the low equivalent weight polyfunctional monomer is capable on polymerization of forming hard a segment (and, in conjunction with other hard segments, crystalline hard regions or domains) and the high equivalent weight polyfunctional monomer is capable on polymerization of producing soft, flexible chains connecting the hard regions or domains. This type of material has not been suggested for use in abrasive filaments.

"Thermoplastic elastomers" differ from "thermoplastics" and "elastomers" (a generic term for substances emulating natural rubber in that they stretch under tension, have a high tensile strength, retract rapidly, and substantially recover their original dimensions) in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics.

Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

"Segmented thermoplastic elastomer", as used herein, refers to the sub-class of thermoplastic elastomers which are based on polymers which are the reaction product of a high equivalent weight polyfunctional monomer and a low equivalent weight polyfunctional monomer.

"Ionomeric thermoplastic elastomers" refers to a subclass of thermoplastic elastomers based on ionic polymers (ionomers). Ionomeric thermoplastic elastomers are composed of two or more flexible polymeric chains bound together at a plurality of positions by ionic associations or clusters. The ionomers are typically prepared by copolymerization of a functionalized monomer with an olefinic unsaturated monomer, or direct functionalization of a preformed polymer. Carboxyl-functionalized ionomers are obtained by direct copolymerization of acrylic or methacrylic acid with ethylene, styrene and similar comonomers by free-radical copolymerization. The resulting copolymer is generally available as the free acid, which can be neutralized to the degree desired with metal hydroxides, metal acetates, and similar salts. A review of ionomer history and patents concerning same is provided in Legge et al., pp. 231–243.

The benefits of thermoplastic elastomers, including ease of processability combined with hard rubber characteristics, have given some unexpected abrasive binding and cutting properties. Filaments made using at least one layer component comprising an abrasive-filled thermoplastic elastomer produce much higher levels of initial cut, maintain their higher cutting ability once an equilibrium condition has been achieved, and exhibit much higher flex fatigue than abrasive-filled nylon filaments.

SUMMARY OF THE INVENTION

The present invention overcomes or reduces many of the problems associated with previously known abrasive filaments. In accordance with the present invention, a abrasive filament is presented comprising a hardened organic polymeric material comprising a thermoplastic elastomer and abrasive particles adhered therein.

One preferred set of abrasive filament embodiments includes a first elongate filament component having a continuous surface throughout its length and including a first hardened organic polymeric material. In these embodiments the abrasive filament further includes a second elongate filament component coterminous with the first elongate filament component, including a second hardened organic polymeric material in melt fusion adherent contact with the first elongate filament component along the continuous surface. The second hardened organic polymeric material can be the same or different than the first hardened organic polymeric material. At least one of the first and second hardened organic polymeric materials includes a thermoplastic elastomer having abrasive particles adhered therein.

Abrasive filaments of the invention exhibit improved life over previously known abrasive-filled nylon filaments. Methods of making such abrasive filaments, articles including the abrasive filaments, and methods of abrading surfaces using the abrasive articles are also presented.

As used herein the term "hardened" refers to the physical state of the organic polymeric material when the temperature of same is below the melting temperature of thermoplastic polymers used herein, and below melting or dissociation temperature of the hard regions (segmented thermoplastic elastomers) or ionic clusters (ionomeric thermoplastic elastomers), as determined through standard tests such as American Society of Testing Materials (ASTM) test D2117. The term can also be used describe the room temperature (i.e. about 10° to about 40° C.) hardness (Shore D scale) in the case of the thermoplastic elastomers used herein. It is preferred that the room temperature Shore D durometer hardness of the thermoplastic elastomers used in the invention be at least about 30, more preferably ranging from about 30 to about 90, as determined by ASTM D790. The term "hardened" is not meant to include physical and/or chemical treatment of the thermoplastic elastomer/abrasive particle mixture to increase its hardness.

As used herein the term "abrasive filament" means a structure wherein a hardened organic polymeric material is at least partially filled with abrasive particles. In embodiments which include first and second elongate filament components, the ratio of the cross-sectional area of the hardened organic polymeric material which includes abrasive particles to the cross-sectional area of the remainder of the filament may vary over a wide range. If the abrasive filament of the invention has a core-sheath structure, and if only one of the core or sheath has abrasive particles therein, the ratio of cross-sectional areas of that part of the filament having abrasive particles to that not having abrasive particles ranges from about 1:1 to about 20:1, preferably from about 1:1 to about 10:1, more preferably from about 1:1 to about 4:1, the cross-sections defined by a plane perpendicular to the abrasive filament major axis. The cross-sectional area of the sheath to that of the abrasive filament is preferably about 40% or greater. The abrasive filaments can be of any length desired, and can of course be round, oval, square, triangular, rectangular, polygonal, or multilobal (such as trilobal, tetralobal, and the like) in cross-section.

"Thermoplastic elastomers" or "TPE" as used herein, refers to the class of polymeric substances which combine the processability (when molten) of thermoplastic materials with the functional performance and properties of conventional thermosetting rubbers (when in their non-molten state), and which are described in the art as ionomeric, segmented, or segmented ionomeric thermoplastic elastomers. The segmented versions comprise "hard segments" which associate to form crystalline hard domains connected together by "soft", long, flexible polymeric chains. The hard domain has a melting or disassociation temperature above the melting temperature of the soft polymeric chains.

Segmented thermoplastic elastomers are preferably the condensation reaction product of a high equivalent weight polyfunctional monomer having an average functionality of at least 2 and an equivalent weight of at least about 350, and a low equivalent weight polyfunctional monomer having an average functionality of at least about 2 and an equivalent weight of less than about 300. The high equivalent weight polyfunctional monomer is capable on polymerization of forming a soft segment, and the low equivalent weight polyfunctional monomer is capable on polymerization of forming a hard segment. Segmented thermoplastic elastomers useful in the present invention include polyester TPEs, polyurethane TPEs, and polyamide TPEs, and silicone elastomer/polyimide block copolymeric TPEs, with the low and high equivalent weight polyfunctional monomers selected appropriately to produce the respective TPE.

The segmented TPEs preferably include "chain extenders", low molecular weight (typically having an equivalent weight less than 300) compounds having from about 2 to 8 active hydrogen functionality, and which are known in the TPE art. Particularly preferred examples include ethylene diamine and 1,4-butanediol.

Ionomeric TPEs are generally included by those skilled in the plastics processing art in the category of TPEs, and are useful as TPE's in this invention. Ionomeric TPEs are characterized by the formation of ionic clusters between two or more flexible "ionomer" (a word which is a contraction of "ionic polymer") chains, each ionic cluster being analogous to a hard crystalline domain in a TPE comprising segmented polymers. The ionomers, as above described, are the copolymerization product of a functionalized monomer with an olefinic unsaturated monomer.

"Thermoplastic polymer", or "TP" as used herein, has a more limiting definition than the general definition, which is "a material which softens and flows upon application of pressure and heat." It will of course be realized that TPEs meet the general definition of TP, since TPEs will also flow upon application of pressure and heat. It is thus necessary to be more specific in the definition of "thermoplastic" for the purposes of this invention. "Thermoplastic", as used herein, means a material which flows upon application of pressure and heat, but which does not possess the elastic properties of an elastomer when below its melting temperature.

Blends of TPE and thermoplastic (TP) materials are also within the invention, allowing even greater flexibility in tailoring mechanical properties of the abrasive filaments of the invention.

Another aspect of the invention is an abrasive article comprised of at least one abrasive filament within the invention as above described, preferably mounted to a substrate such as a hub adapted to be rotated at a high rate of revolution. If the article includes more than one abrasive filament, they can be the same or different in composition and shape. The preferred abrasive filaments used in abrasive articles of the invention are application dependent, but those filaments including an abrasive-filled polyester TPE have proved useful in abrading many types of workpieces when attached to a rotating hub, while exhibiting greater resistance to flex fatigue than abrasive-filled nylon filaments.

A further aspect of the invention is a method of making an abrasive filament of the core-sheath type within the invention as above described, the method including the steps of (a) rendering a first organic polymeric material comprising a thermoplastic elastomer molten and adding abrasive particles thereto;

(b) rendering a second organic polymeric material molten, the second organic polymeric polymer selected from the group consisting of thermoplastic elastomers, thermoplastic polymers, and mixtures thereof;

(c) forcing the first a second molten organic materials simultaneously through distinct first and second passages within the same die, the distinct passages forcing the first and second molten organic polymeric materials to assume the shape of first and second elongate filament components in melt fusion adherent contact along a continuous surface of the first component, thus forming an abrasive filament precursor; and (d) cooling the abrasive filament precursor to a temperature sufficient to harden the first and second molten organic polymeric materials and thus form the abrasive filament.

Preferred are methods wherein the TPE of the first (and second, if a TPE is employed) component is segmented and wherein an extruder is used to render the first and second organic polymeric materials molten. As used herein the term "molten" means the organic polymeric materials are heated to a temperature at least above the melting temperature of the soft segment for TPEs, more preferably above the dissociation temperature of the hard regions or ionic clusters of the TPEs, or above the melting temperature of TPs.

Also presented is a method of abrading a workpiece with an abrasive article incorporating at least one abrasive filament of the invention attached to a substrate, the method comprising creating relative movement between a workpiece and the abrasive article so that the abrasive filament(s) contacts and abrades the workpiece. Alternatively, the abrasive filaments may abrade a workpiece without the benefit of a substrate, such as when a plurality of filaments are formed into a lofty, open mat, and the mat and/or workpiece moved against each other with pressure, or when a single abrasive filament is used to finish or cut a workpiece. Preferred substrates are metallic hubs, synthetic floor pads, wood, wood-like materials, and plastic.

Other aspects and advantages of the invention will become apparent from the detailed description which follows.

BRIEF DESCRIPTION OF THE DRAWING

FIGS. 1–5 each show an enlarged perspective view of one of five core-sheath embodiments of abrasive filaments within the invention, each having a portion of its sheath removed to show the core;

DESCRIPTION OF PREFERRED EMBODIMENTS

Figure 6:
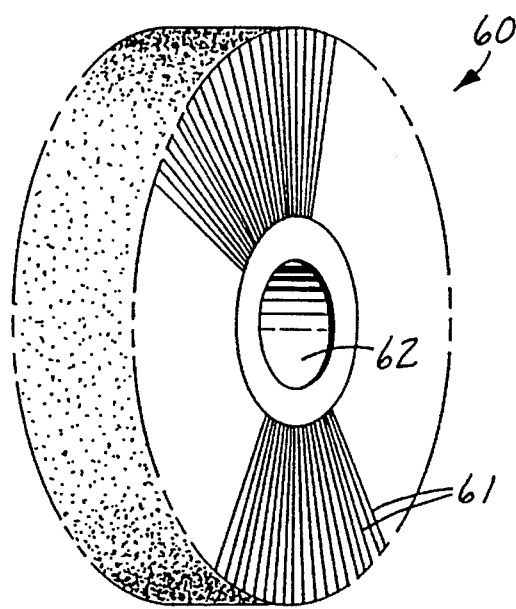
FIG. 6 shows a perspective view of one embodiment of a brush tool (in this case a rotary brush tool) incorporating abrasive filaments of the invention.
Figure 7:
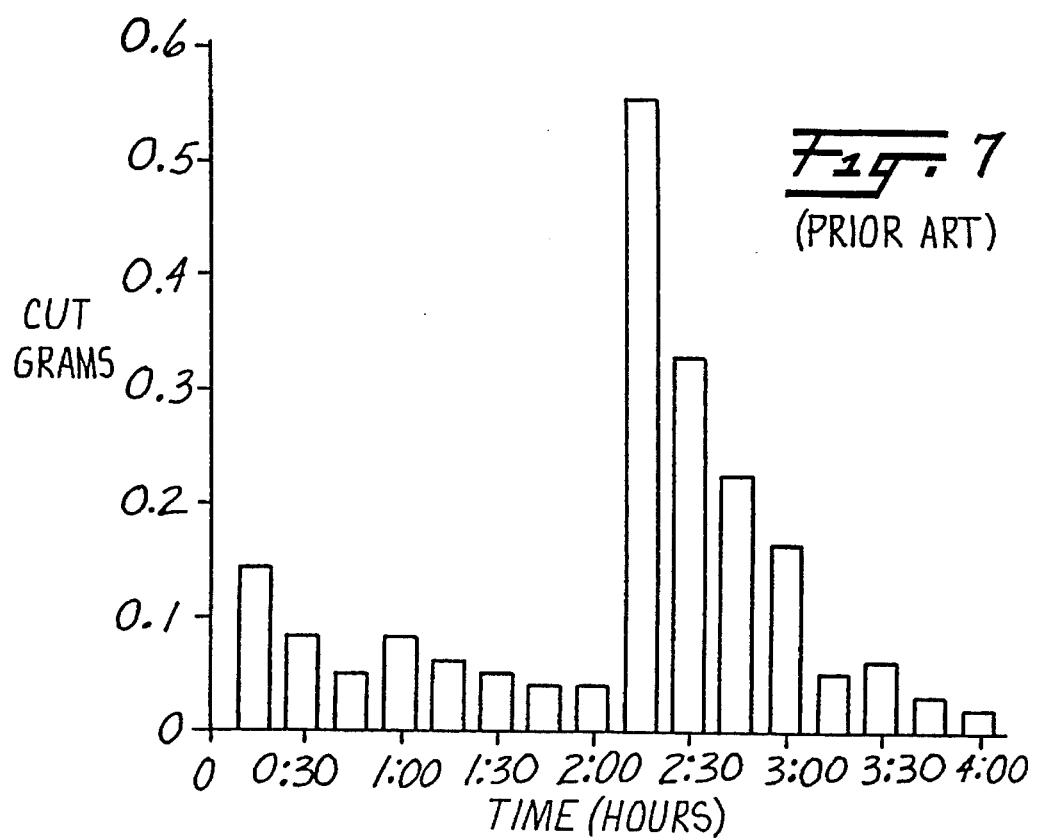
FIG. 7 is a bar graph which reveals the weight in grams removed from a workpiece (also referred to in the art as "cut") as a function of time for a rotating brush tool having a plurality of prior art abrasive-filled nylon filaments.

As previously generally described, the present invention presents an abrasive filament comprising a thermoplastic elastomer and abrasive particles adhered therein. Aspects of the invention are now described in greater detail.

Core-Sheath Abrasive Filament Embodiments

Five core-sheath embodiments 10, 20, 30, 40, and 50 of abrasive filaments in accordance with the present invention are illustrated in enlarged perspective views in FIGS. 1–5, where in each embodiment it will be appreciated that a portion of the sheath has been removed to show the respective cores. It will also be appreciated that the core or sheath (or both) containing the abrasive particles may have only a section or portion of the core or sheath so filled.

Referring now to FIG. 1, an abrasive filament 10 has a first elongate filament component in the form of core 12, including a first hardened organic polymeric material 14 (in this embodiment a TPE 14) and abrasive particles 16. The TPE 14 of the elongate filament component core 12 has dispersed throughout and adhered therein a plurality of abrasive particles 16, such as aluminum oxide or silicon carbide abrasive particles. A second elongate filament component 18 in the form of a sheath is illustrated, consisting of a second hardened organic polymeric material (in this embodiment a thermoplastic polymer). Filament major axis A is indicated in each of FIGS. 1–5.

FIG. 2 illustrates an alternate abrasive filament embodiment 20, wherein the first elongate filament component is in the form of a core 12a, formed from a first TPE 14a, and the sheath is formed of from a second TPE 18a and abrasive particles 16a. In this embodiment, only the sheath includes abrasive particles.

FIG. 3 illustrates another core-sheath abrasive filament embodiment 30 having a first TPE 14b and a second TPE 18b, and wherein both core and sheath include abrasive particles 16a and 17, respectively. Abrasive particles 16a and 17 may of course be the same or different in terms of type, particle size, particle size distribution, and distribution within the core and sheath.

FIGS. 4 and 5 represent core-sheath abrasive filament embodiments 40 and 50, respectively, employing two different TPEs, or a TPE and a TPE/TP blend, as the first and second components. The filament of embodiment 40 includes a first TPE 14c and abrasive particles 16c in the core component 12c with a second TPE or TPE/TP blend as sheath component 18c. The embodiment 50 of FIG. 5 is the reverse of embodiment 40, with core 12d formed of a TPE or TPE/TP blend 14d, and sheath comprising a second TPE 18d and abrasive particles 16d.

The abrasive filaments as shown schematically in FIGS. 1–5 may have core and total abrasive filament diameters within a broad range, limited only by the size of the apparatus used produce the molten TPEs and TPs, and the article to which the abrasive filaments are to be attached. Obviously, as the diameter of the abrasive filament increases, the number of abrasive filaments which can be attached to a substrate, such as a hub of a given size, decreases. Core diameters, for abrasive filaments of the present invention which are core-sheath structures, for abrasive filaments used in typical hand-held tools, are preferably at least about 0.1 mm, while the abrasive filaments themselves preferably have a diameter ranging from about 1.0 mm to about 2.0 mm. These dimensions could, of course, increase tremendously for a large abrading device, and abrasive filaments having much larger core and total diameters are considered within the scope of the appended claims.

Abrasive filaments of the invention having a diameter ranging from about 1.0 mm to about 2.0 mm have an ultimate breaking force (measured using a standard tensile tester known under the trade designation "Sintech", according to the test described in Test Methods) of at least about 0.5 kg (untensilized), preferably at least about 1.0 kg (untensilized); a 50% fatigue failure resistance of at least about 15 minutes (according to the test described in Test Methods); and an abrading efficiency (weight of workpiece removed per weight of filament lost) on cold rolled steel (1018) plate of at least about 2. As may be seen by the examples herein below, balancing these preferences may be workpiece dependent.

Thermoplastic Elastomers

Segmented TPEs useful in the abrasive filaments the present invention generally and preferably comprise the reaction product of a high equivalent weight polyfunctional monomer having a functionality of at least about 2 and an equivalent weight of at least about 350 adapted to form a soft segment upon polymerization, and a relatively low equivalent weight polyfunctional monomer having a functionality of at most about 2 and an equivalent weight of at most about 300, adapted to form a hard segment upon polymerization.

Chain extenders are typically used in segmented thermoplastic elastomers to increase the hard segment and hard domain size and thus provide one mechanism to alter the physical properties of the resultant segmented TPE. Chain extenders useful in the segmented TPEs of the present invention preferably have an active hydrogen functionality of ranging from about 2 to 8, preferably from about 2 to 4, and more preferably from about 2 to 3, and an equivalent weight less than about 300, more preferably less than about 200. Well suited chain extenders are the linear glycols such as ethylene glycol, 1,4-butanediol, 1,6-hexanediol, and hydroquinone bis(2-hydroxyethyl) ether. Nonlinear diols are normally not suitable as chain extenders for segmented TPEs because the urethanes formed therefrom do not form well defined hard segments and therefore exhibit poor low and high temperature properties. Similarly, although low molecular weight polyfunctional amines including, aromatic, alkyl-aromatic, or alkyl polyfunctional amines, are normally excellent chain extenders, they normally cannot be used in the segmented TPEs of the present invention because the resultant urea groups in the resulting TPE melt well above the useful processing range of the TPE and undergo some degradation on melting.

Segmented TPEs useful in the abrasive filaments of the present invention preferably comprise segmented polyester TPEs, segmented polyurethane TPEs, and segmented polyamide TPEs. The low and high equivalent weight polyfunctional monomers are variously chosen to produce one of the above segmented TPEs. For example, if the TPE comprises a segmented polyester, such as the segmented copoly(ether-ester)s, the low and high equivalent weight polyfunctional monomers are preferably poly(tetramethylene terephthalate) and poly(tetramethylene oxide), respectively. If the TPE comprises a segmented polyurethane, the low equivalent weight polyfunctional monomer is preferably a polyfunctional isocyanate and the high equivalent weight polyfunctional monomer is preferably a polyfunctional amine.

The weight percent of low equivalent weight polyfunctional monomer in the total weight of monomers which react to produce segmented TPEs preferably ranges from about 20 to about 60 percent, more preferably ranging from about 20 to about 40 percent. Low equivalent weight polyfunctional monomer weight percentages above these ranges generally yield segmented TPEs exhibiting increased hardness, bending modulus, and tensile modulus, accompanied with an increase in glass transition temperature ($T_g$). At weight percentages of low equivalent weight polyfunctional monomer above about 70 weight percent, a phase transition occurs, which leads to a change in the overall behavior from that of a TPE to a more brittle plastic. At weight percentages of low molecular weight polyfunctional monomer below about 20, the TPE behavior more resembles a rubber, and at high filament temperatures the abrasive filaments of the invention may tend to "smear". (An industry term of art, "smear" refers to the transfer of portions of the abrasive article to the surface of the workpiece in the case of metal-working applications, or the glazing over of the article's surface in the case of wood-working applications. Smear occurs when heat is generated by frictional rubbing of the abrasive article against a workpiece.)

Ionomers useful in forming ionomeric TPEs typically and preferably comprise the reaction product of a functionalized monomer with an olefinic unsaturated monomer, or comprise a polyfunctionalized preformed polymer. Within the terms "ionomeric TPEs" and "ionomers" are included anionomers, cationomers, and zwitterionomers. TPEs (segmented and ionomeric) useful in abrasive filaments of the invention preferably have Shore D durometer hardness values ranging from about 30 to about 90, more preferably ranging from about 50 to about 80, with the hardness of the segmented TPEs governed primarily by the relative equivalent weights and amounts of the low and high equivalent weight polyfunctional monomers, while hardness of ionomeric TPEs is primarily governed by relative amounts of functionalized monomer and olefinic unsaturated monomer.

The mechanical properties of segmented thermoplastic elastomers (such as tensile strength and elongation at break) are dependent upon several factors. The proportion of the hard segments in the polymers which form the TPEs, their chemical composition, their molecular weight distribution, the method of preparation, and the thermal history of the TPE all affect the degree of hard domain formation. Increasing the proportion of the low equivalent weight polyfunctional monomer tends to increase the hardness and the modulus of the resultant TPE while decreasing the ultimate elongation.

The upper use temperature of segmented TPEs is dependent upon the softening or melting point of the low equivalent weight polyfunctional monomer comprising the hard segments. For long term aging, the stability of the high equivalent weight polyfunctional monomer comprising the soft segment is also important. At elevated temperatures and with a lower percentage of hard segments which can contribute to hard domains, bending modulus and tensile strength of the TPE are generally reduced. As may be apparent to those skilled in the plastics processing art, to extend the upper useful temperature of a segmented TPE, it is necessary to introduce low equivalent weight polyfunctional monomers adapted to form hard domains which soften or melt at higher temperatures. However, although increasing the amount of or equivalent weight of low equivalent weight polyfunctional monomers can lead to higher TPE hardness, reduced elastic properties and reduced flex fatigue resistance of the abrasive filaments made therefrom may result.

Preferred TPEs having the above properties and useful in the invention include those formed from segmented polyesters represented by general formula I

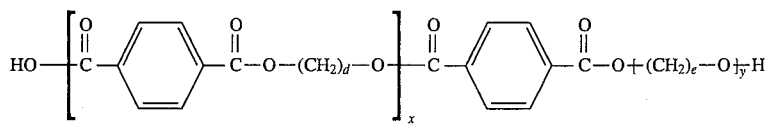

and mixtures thereof wherein:

d and e are integers each ranging from about 2 to about 6, and wherein d and e may be the same or different, but not differing by more than 1 integer; and x and y are integers selected so that the resulting segmented polyester TPE has a Shore D durometer hardness ranging from about 30 to about 90.

Total molecular weight (number average) of segmented polyesters within general formula I ranges from about 20,000 to about 30,000; x ranges from about 110 to about 125; and y ranges from about 30 to about 115, more preferably from about 5 to about 70.

Commercially available and preferred segmented polyesters represented by general formula I include those known under the trade designations "Hytrel 4056", "Hytrel 5556", "Hytrel 6356", "Hytrel 7246", and "Hytrel 8238" available from E. I. du Pont de Nemours and Company, Inc., Wilmington, Del. (du Pont), wherein both d and e are 4. Particularly preferred are the versions having Shore D hardness of 63 and 72 ("Hytrel 6356" and "Hytrel 7246", respectively). A similar family of thermoplastic polyesters are available under the tradenames "Riteflex" (Hoechst Celanese Corporation). Still further useful polyester TPEs are those known under the trade designations "Ecdel", from Eastman Chemical Products, Inc., Kingsport, Tenn., and "Lomod B0520", from General Electric Company.

The hardened compositions comprising thermoplastic elastomer and abrasive particles are of course not limited to those components. Glass fiber-reinforced polyester thermoplastic elastomers (trade designation "Thermocomp YF") are available from ICI Advanced Materials, LNP Engineering Plastics, Exton, Pa.

Preferred ionomers used to form ionomeric TPEs useful in the invention comprise the copolymerization reaction product of a functionalized monomer and an olefinic unsaturated monomer, the ionomers being represented by general formula II

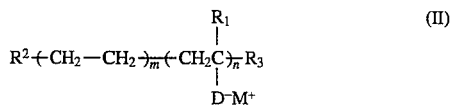

and mixtures thereof wherein:

$R^1$, $R^2$, and $R^3$ which may be the same or different and are selected from the group consisting of hydrogen, alkyl, substituted alkyl, aryl, and substituted aryl;

m and n are integers which may be the same or different which are selected so that the weight percentage of the functionalized monomer ranges from about 3 to about 25 weight percent of the total ionomer weight and so that the resulting ionomeric TPE has a Shore D durometer ranging from about 30 to about 90;

D is a functional group selected from the group consisting of COO and $SO_3$,; and M is selected from the group consisting of Na, Zn, K, Li, Mg, Sr, and Pb.

Particularly preferred are those ionomers represented by general formula II wherein $R^1=R^2=R^3=CH_3$ and D=COO. A particularly preferred ionomer is when $R^1=CH_3$, D=COO, and M=Na, such an ionomer being commercially available, for example that known under the trade designation "Surlyn 8550" (du Pont).

The values of m and n are normally not given by manufacturers but are selected to provide the resulting ionomeric TPE with a room temperature Shore D durometer ranging from about 30 to about 90. Alternatively, m and n may be characterized as providing the molten ionomeric TPE with a flow rate (formerly termed "melt index" in the art) ranging from about 1 gm/10 mins to about 10 gms/10 mins (as per ASTM test D1238-86, condition 190/2.16, formerly D1238-79, condition E). Briefly, the test involves placing a sample within the bore of a vertical, heated cylinder which is fitted with an orifice at the bottom of the bore. A weighted piston is then placed within the cylinder bore, and the amount in grams of molten polymer exiting the cylinder through the orifice is recorded in grams for a 10 minute period.

The functionalized monomer may be selected from acrylic acid, methacrylic acid, vinyl acetate, and the like, and copolymers thereof, with acrylic and methacrylic acid particularly preferred.

The olefinic monomer may be selected from ethylene, propylene, butadiene, styrene, and the like, and copolymers thereof, with ethylene being the olefinic monomer of choice due to its availability and relatively low cost.

The functionalized monomer and olefinic monomer are typically and preferable directly copolymerized using free radicals, such methods being well known in the art and needing no further explanation herein.

Particularly preferred segmented polyamides useful in making segmented polyamide TPEs useful in the invention are those segmented polyamides represented by general formula III

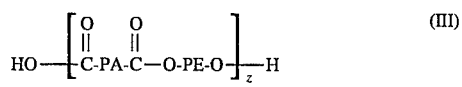

and mixtures thereof, wherein:

PA=a difunctional polyamide having equivalent weight less than about 300;

PE=a dihydroxypolyether block having equivalent weight of at least 350 and comprising polymers selected from the group consisting of dihydroxypolyoxyethylene, dihydroxypolyoxypropylene, and dihydroxypolyoxytetramethylene; and z=an integer selected to provide the resulting segmented polyamide TPE with a Shore D durometer hardness ranging from about 30 to about 90.

Segmented polyamides within formula III are commercially available, such as those known under the trade designation "Pebax", available from Atochem Group of Elf Aquitaine, with the 63 and 70 Shore D durometer versions being particularly preferred in the present invention. Although values of z are proprietary to the manufacturers, and polymers within general formula III may be characterized according to hardness, they may alternatively be characterized according to their melt flow rate (as described above), with values ranging from about 1 gm/10 min to about 10gm/10 min being preferred (ASTM 1238-86, 190/2.16).

Particularly preferred segmented polyurethanes useful in making polyurethane TPEs useful in the invention are those segmented polyurethanes represented by general formula IV

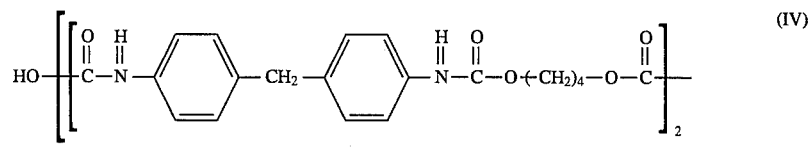

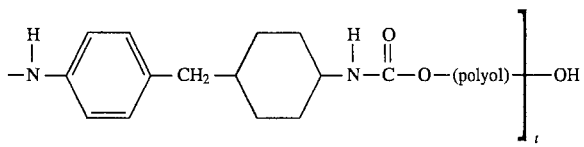

and mixtures thereof wherein:
polyol=a polyester polyol or polyether polyol having an average molecular weight ranging from about 600 to about 4000; and
t=an integer selected to provide the resulting segmented polyurethane TPE with a Shore D durometer hardness ranging from about 30 to about 90.

The value of "t" is chosen relative to the molecular weight of the polyol to give a range of molecular weights; typically and preferably, the number average molecular weight of segmented polyurethanes represented by general formula IV ranges from about 35,000 to about 45,000.

In general, segmented polyurethanes may be made by mixing the first and second polyfunctional monomers and chain extender together at temperatures above about 80° C. Preferably, the ratio of isocyanate functional groups to isocyanate reactive groups ranges from about 0.96 to about 1.1. Values below about 0.96 result in polymers of insufficient molecular weight, while above about 1.1 thermoplastic processing becomes difficult due to excessive crosslinking reactions.

Segmented polyurethanes within formula IV which are commercially available and preferred are those known under the trade designation "Estane", available from B. F. Goodrich, Cleveland, Ohio, particularly grades 58409 and 58810. Other segmented preferred segmented polyurethanes include those known under the trade designations "Pellethane", and "Isoplast" from The Dow Chemical Company, Midland, Mich. (Dow Chemical), and those known under the trade designation "Morthane", form Morton Chemical Division, Morton Thiokol, Inc.; and those known under the trade designation "Elastollan", from BASF Corporation, Wyandotte, Mich.

As mentioned previously, blends of TPEs and other polymers have also proven useful, such as the polyurethane/acrylonitrile-butadiene-styrene blends known under the trade designation "Prevail", grades 3050, 3100, and 3150, all from Dow Chemical. Grade 3050 has a melt flow rate (ASTM-1238-86, 230/2.16) of 26 gm/10 min, and a Shore D hardness of about 62.

Block copolymers regarded by those skilled in the plastics processing art as TPEs, including the elastomeric copolymers of silicones and polyimides, may also prove useful in abrasive filaments of the invention. Commercially available elastomeric copolymers of thermoplastic silicones and polyimides include those known under the trade designation "Siltem STM-1500", from GE Silicones. These copolymers have a tensile strength of about 25 MPa, elongation of 105%, and flexural modulus of about 415 MPa, according to published values (*Design News*, May 22, 1989, page 40).

Each of the polymers within formulas I–IV as shown above are now discussed in greater detail.

Segmented Polyesters

As noted above, if the TPE is based on a segmented polyester, such as the segmented copoly(etherester) as shown in formula I, the low and high equivalent weight polyfunctional monomers are preferably based on poly(tetramethylene terephthalate) which forms the hard segment upon polymerization and poly(tetramethylene oxide) which forms the soft segment upon polymerization, respectively. The poly(ether) component of the copoly(etherester) is preferably derived from α-hydro-ω-hydroxyoligo(tetramethylene oxide) of number average molecular weight ranging from about 1,000 to about 2,000. The copoly(ester) component of the copoly(etherester) is preferably based on poly(tetramethylene terephthalate) which forms hard segments upon polymerization, having average molecular weights ranging from about 600 to about 3,000. The molecular weight for copoly(etherester) polyesters within formula I preferably ranges from about 20,000 to about 40,000. For a more comprehensive discussion of segmented polyesters, see Legge et al. pages 164–196, incorporated by reference herein.

Ionomers

Ionomers which may behave as ionomeric TPEs and thus useful in the present invention, such as those ionomers known under the trade designation "SURLYN" (formula II), are preferably prepared by copolymerization of a functionalized monomer and an olefinic unsaturated monomer, or by direct functionalization of a preformed polymer, as previously noted. Ionomers within formula II are particularly preferred for forming ionomeric TPEs for use in hardened compositions in abrasive filaments of the invention. The large quantities of commercial quality ethylene/methacrylic acid copolymers, for example containing between about 5 and about 20 weight percent methacrylic acid component, makes these ionomers particularly useful in the present invention.

M in formula II is typically and preferably chosen from sodium (Na) and zinc (Zn), although ionomers using potassium (K), lithium (Li), magnesium (Mg), strontium (Sr) and lead (Pb) are considered within the scope of formula II.

The use of sodium as the cation in formula II may be desired where water absorption by the ionomeric TPE on the abrasive filaments is not a concern, whereas zinc exhibits a much lower water absorption and is thus preferred where water absorption is a concern. Ionomers are preferably neutralized while in the melt, preferably with a metallic reagent added as an oxide, hydroxide or methylate, either dry or as a concentrated solution. As neutralization proceeds, the melt increases in elasticity. Stiffness increases with degree of neutralization, reaching a plateau at about 40% neutralization. However, tensile strength continues to increase at higher levels of neutralization. A preferred degree of neutralization is about 70% to 80% neutralization, since tensile strength of ionomeric TPEs usually plateaus at this point. Neutralization is preferably achieved by the use of metallic acetates, the acetic acid being removed by volatilization. Acetates of zinc, lead, copper, barium, cobalt and nickel all give clear melts and quantitative "cross-linking". A further discussion of ionomers is presented in Legge, et al., pages 231–268, incorporated by reference herein.

Segmented Polyamides

Polyamides within formula III and useful forming segmented polyamide TPEs for use in the invention are typically described as polyether block amides (or "PEBA"), wherein the latter may be obtained by the molten state polycondensation reaction of dihydroxypolyether blocks and dicarboxylic acid-based polyamide blocks as shown in formula III (wherein PA represents "polyamide" and PE represents "polyether"). Dicarboxylic polyamide blocks may be produced by the reaction of polyamide precursors with a dicarboxylic acid chain limiter. The reaction is preferably carried out at high temperature (preferably higher than 230° C.) and preferably under pressure (up to 2.5 MPa). The molecular weight of the polyamide block is typically controlled by the amount of chain limiter.

The polyamide precursor can be selected from amino acids such as aminoundecanoic acid and aminododecanoic acid; lactams, such as caprolactam, lauryl lactam, and the like); dicarboxylic acids (such as adipic acid, azelaic acid, dodecanoic acid, and the like); and diamines (such as hexamethylene diamine, dodecamethylene diamine, and the like).

The dihydroxypolyether blocks may be produced from polyether precursors by either of two different reactions: an ionic polymerization of ethylene oxide and propylene oxide to form dihydroxypolyoxyethylene and dihydroxypolyoxypropylene polyether precursors; and cationic polymerization of tetrahydrofuran for producing dihydroxypolyoxytetramethylene polyether precursors.

The polyether block amides are then produced by block copolymerization of the polyamide precursors and dihydroxypolyether precursors. The block copolymerization is a polyesterification, typically achieved at high temperature (preferably ranging from 230° to 280° C.) under vacuum (10 to 1,400 Pa) and the use of an appropriate catalyst such as $Ti(OR)_4$, where R is a short chain alkyl. It is also generally necessary to introduce additives such as an antioxidant and/or optical brighteners during polymerization.

The structure of the resulting polyether block amides comprises linear, regular chains of rigid polyamide segments and flexible polyether segments. Since polyamide and polyether segments are not miscible polyether block amides such as those represented by formula III present a "biphasic" structure wherein each segment offers its own properties to the polymer. Owing to the structure, it is possible to alter four basic chemical criteria to control the physical properties of the polyether block amide: the nature of the polyamide block, the nature of the polyether block, the length of the polyamide blocks and the mass relationship between the polyamide and polyether blocks. The nature of the polyamide block influences the melting point, specific gravity, and chemical resistance of the polyether block amide, while the polyether block influences the glass transition temperature, hydrophilic properties, and anti-static performance. The length of the polyamide block influences the melting point of the polymer, and the mass relationship of the polyamide and polyether blocks controls the hardness properties. For example, it is possible to synthesize grades of polyether block amides having Shore hardness ranging from about 75 D to as low as about 60 A. Increasing polyether content generally reduces tensile strength and elastic nature of the polyether block amides. (See Legge et al., pages 217–230, incorporated by reference herein.)

Segmented Polyurethanes

Segmented polyurethane TPEs useful in the present invention are preferably formed from segmented polyurethanes within formula IV, which are comprised of a high equivalent weight polyfunctional monomer and a low equivalent weight polyfunctional monomer as above described, and may also include a low molecular weight chain extender, also as above described. In thermoplastic polyurethane elastomers, the hard segment is formed by addition of the chain extender, for example, 1,4-butane diol, to a diisocyanate, for example, 4,4'-diphenylmethane diisocyante (MDI). The soft segment consists of long, flexible polyether or polyester polymeric chains which connect two or more hard segments. At room temperature, the low melting soft segments are incompatible with the polar, high melting hard segments, which leads to a microphase separation.

Polyurethanes useful in forming segmented polyurethane TPEs are generally made from long chain polyols having an average molecular weight ranging from about 600 to 4,000 (high equivalent weight polyfunctional monomer), chain extenders with a molecular weight ranging from about 60 to about 400, and polyisocyanates (low equivalent weight polyfunctional monomer). Preferred long chain polyols are the hydroxyl terminated polyesters and the hydroxyl terminated polyethers.

A preferred hydroxyl terminated polyester is made from adipic acid and an excess of a glycol such as ethylene glycol, 1,4-butanediol, 1,6-hexanediol, neopentyl glycol, or mixtures of these diols. The reaction producing the hydroxyl-terminated polyesters from these ingredients is preferably carried out at temperatures up to about 200° C., with the resulting polyester having an acid number of less than about 2, and composed of all possible oligomers ranging from monomeric glycol to high molecular weight species. Other acids which may be used in the production of hydroxyl terminated polyesters include azelaic acid, and terephthalic acid, either alone or in mixture with adipic acid. Generally, the presence of aromatic or cycloaliphatic rings in the acid or in the diol increases the glass transition temperature of the hydroxyl-terminated polyester. Polycaprolactones and aliphatic polycarbonates may be preferable in some applications due to their unique physical properties. The polycaprolactones are preferably made from ε-caprolactone and a bifunctional initiator, for example, 1,6-hexanediol. The polycarbonates offer excellent hydrolytic stability and are made from diols, for example, 1,6-hexanediol, and phosgene, or by transesterification with low molecular weight carbonates like dimethyl or diethylcarbonate.

Long chain polyether polyols useful in making polyurethanes within formula IV useful in making segmented polyurethane TPEs useful in abrasive filaments of the invention are preferably of two classes: the poly(oxypropylene)glycols and the poly(oxytetramethylene)glycols. The former glycols may be made by the base catalyzed addition of propylene oxide and/or ethylene oxide to bifunctional initiators, for example, propylene glycol or water, while the latter may be made by cationic polymerization of tetrahydrofuran. Both of these classes of polyethers have a functionality of about 2. The mixed polyethers of tetrahydrofuran and ethylene or propylene oxide may also be effectively used as the soft segment in the polyurethane TPE.

In contrast to other polyurethanes, only a few polyisocyanates are suitable for producing thermoplastic elastomer polyurethanes. The most useful preferred polyisocyanate is MDI, mentioned above. Others include hexamethylene diisocyanate (HDI), 1-isocyanato-3-isocyanatomethyl-3,5,5-trimethylcyclohexane (IPDI); 2,4 and 2,6-toluene diisocyanate (TDI); 1,4 benzene diisocyanate, and trans-cyclohexane-1,4-diisocyanate.

Abrasive Particles

Abrasive particles are preferably dispersed throughout and adhered within the hardened TPE coating. Abrasive particles useful in the abrasive filaments of the present invention may be individual abrasive grains or agglomerates of individual abrasive particles. Suitable agglomerated abrasive particles are described in U.S. Pat. Nos. 4,652,275 and 4,799,939, incorporated by reference herein. The abrasive particles may be of any known abrasive material commonly used in the abrasives art. Preferably, the abrasive particles have a hardness of greater than about 7 Mohs, most preferably greater than about 9 Mohs. Examples of suitable abrasive particles include individual silicon carbide abrasive particles (including refractory coated silicon carbide abrasive particles such as disclosed in U.S. Pat. No. 4,505,720), fused aluminum oxide, heat treated fused aluminum oxide, alumina zirconia (including fused alumina zirconia such as disclosed in U.S. Pat. Nos. 3,781,172; 3,891,408; and 3,893,826, commercially available form the Norton Company of Worcester, Mass., under the trade designation "NorZon"), cubic boron nitride, garnet, pumice, sand, emery, mica, corundum, quartz, diamond, boron carbide, fused alumina, sintered alumina, alpha alumina-based ceramic material (available from Minnesota Mining and Manufacturing Company (3M), St. Paul, Minn., under the trade designation "Cubitron"), such as those disclosed in U.S. Pat. Nos. 4,314,827; 4,518,397; 4,574,003; 4,744,802; 4,770,671; and 4,881,951, and combinations thereof.

The abrasive particles are preferably present at a weight percent (of filament component(s) containing the abrasive particles) ranging from about 0.1 to about 60, more preferably ranging from about 25 to about 50.

In order to achieve the higher abrasive particle loadings it may be necessary, depending on the TPE and or TP employed, to coat the abrasive particles with a coupling agent prior to introduction into the polymer melt. Alternatively, the coupling agent is added to the polymer melt in the form of a pellet containing from about 10 to about 30 weight percent coupling agent, and from about 70 to 90 weight percent of a TPE. In this latter method, which is preferred, the coupling agent-containing pellets are added to the polymer melt in an extruder "upstream" of the point where the abrasive particles are added. The addition rate is calculated to provide a weight percent coupling agent per total weight of filament component containing abrasive particles ranging from 0.1 to about 2.0, more preferably ranging from about 0.1 to about 0.3.

Coupling agents found useful and thus preferred for use in this invention are the neopentyl(diallyl)oxy titanates, such as neopentyl(diallyl)oxy,tri(m-amino)phenyl titanate and neopentyl(diallyl) oxy, tri(dioctyl)phosphato titanate. The tri(m-amino)phenyl and tri(dioctyl)phospato versions are available in pellet form (20 weight percent in TPE) under the trade designations "LICA 97/E" and LICA 12/E", respectively, from Kenrich Petrochemicals, Inc., Bayonne, N.J.

The surface of the abrasive particles (or a portion of their surface, or a portion of the particles but their whole surface) may be treated with coupling agents to enhance adhesion to and dispersibility in the molten TPE. Coupling agents may enhance the tensile strength of the abrasive filaments. Surprisingly, there appears to be a variation in the increase in abrasion efficiency of abrasive filaments similar in all respects except the type of coupling agent. The neopentyl-(diallyl)oxy,-tri(dioctyl)phosphato titanate is particularly preferred as it produced a substantial increase in efficiency over similar filaments containing no coupling agent or containing the neopentyl(diallyl)oxy,tri(m-amino)phenyl titanate, as exemplified in Examples 5–7, below.

The size of the abrasive particles incorporated into the abrasive filaments of the invention depends on the intended use of the filaments. For applications requiring cutting or rough finishing, larger abrasive particles are preferred, while abrasive particles having smaller size are preferred for finishing applications. Preferably, the average diameter of the abrasive particles is no more than about ½ the diameter of the abrasive filament, more preferably no more than about ⅓ of the diameter of the abrasive filament.

The abrasive particles are not required to be uniformly dispersed in the hardened composition, but a uniform dispersion may provide more consistent abrasion characteristics.

Abrasive Articles

Abrasive filaments of the invention may be incorporated into a wide variety of brushes, either clumped together to form an open, lofty abrasive pad, or attached to various substrates.

FIG. 6 shows one embodiment of a wheel brush 60 within the invention having a plurality of abrasive filaments 61 glued or otherwise attached to a polymeric hub 62, such methods of attachment being well known in the art.

In the Examples below, a metal hub was employed, the construction of which is explained under the heading "Test Brush Construction".

A polymeric hub, such as that illustrated in FIG. 6, was used in Examples 25–27 of assignee's copending application, cross-referenced previously. In order to make a polymeric hub, a mold is typically fabricated so that abrasive filaments can be employed in the form of abrasive brushes as shown FIG. 6 of this invention. A round base plate is fabricated with a 3.18 cm diameter center through hole which is adapted to accept a solid, cylindrical core piece having outer diameter slightly less than 3.18 cm. Slots are machined into one surface of the base plate to create a radial pattern so that thin metal spacers can be inserted therein. The slots extend radially, starting from a point about 5 cm from the center through hole and extending to the periphery of the plate. A right cylinder (200 mm I.D.) may then be fastened to the surface of the base plate having the slots so that the hole in the base plate and the cylinder are concentric.

The spacers may then be put in the slots, the solid, cylindrical core piece inserted in the through hole, and a multiplicity of abrasive filaments having length equal to the slot length plus about 5 cm aligned within the spaces left between the spacers. The spacers provide a method to uniformly and closely distribute the abrasive filaments radially with a predetermined length. The abrasive filaments can then be held firmly with a clamp ring, which fits over the end of the filaments pointing toward the center through hole.

A polymeric cast hub is then formed by pouring a liquid epoxy or other resin into the center cavity formed between the solid, cylindrical center core piece and the clamp ring. One resin found useful in assignee's copending application was the two-part epoxy resin known under the trade designation "DP-420", from 3M. When the resin is fully cured, the brush may be removed from the device and then tested, as in Examples 25–27 and Comparative Example F of assignee's copending application.

The abrasive filaments of this invention can of course be employed with polymeric hubs as just described.

Another method of making abrasive brushes employing the abrasive filaments of the invention is by using a conventional "channel" brushmaking machine, such as that sold under the trade designation "Model Y", available from Carlson Tool and Machine Company, Geneva, Ill.

The abrasive filaments of this invention can be incorporated into brushes of many types and for myriad uses, such as cleaning, deburring, radiusing, imparting decorative finishes onto metal, plastic, and glass substrates, and like uses. Brush types include wheel brushes, cylinder brushes (such as printed circuit cleaning brushes), mini-grinder brushes, floor scrubbing brushes, cup brushes, end brushes, flared cup end brushes, circular flared end cup brushes, coated cup and variable trim end brushes, encapsulated end brushes, pilot bonding brushes, tube brushes of various shapes, coil spring brushes, flue cleaning brushes, chimney and duct brushes, and the like. The filaments in any one brush can of course be the same or different in construction, configuration, length, etc.

Two particularly preferred uses of brushes employing filaments of the invention are printed circuit board cleaning and steel plate cleaning.

Method of Making Abrasive Filaments

The following paragraphs discuss methods of producing core-sheath abrasive filaments within the invention. Embodiments which comprise a TPE and abrasive particles adhered therein may be produced using the same equipment, however the "sheath" is not added to the filament structure.

Figure 8:
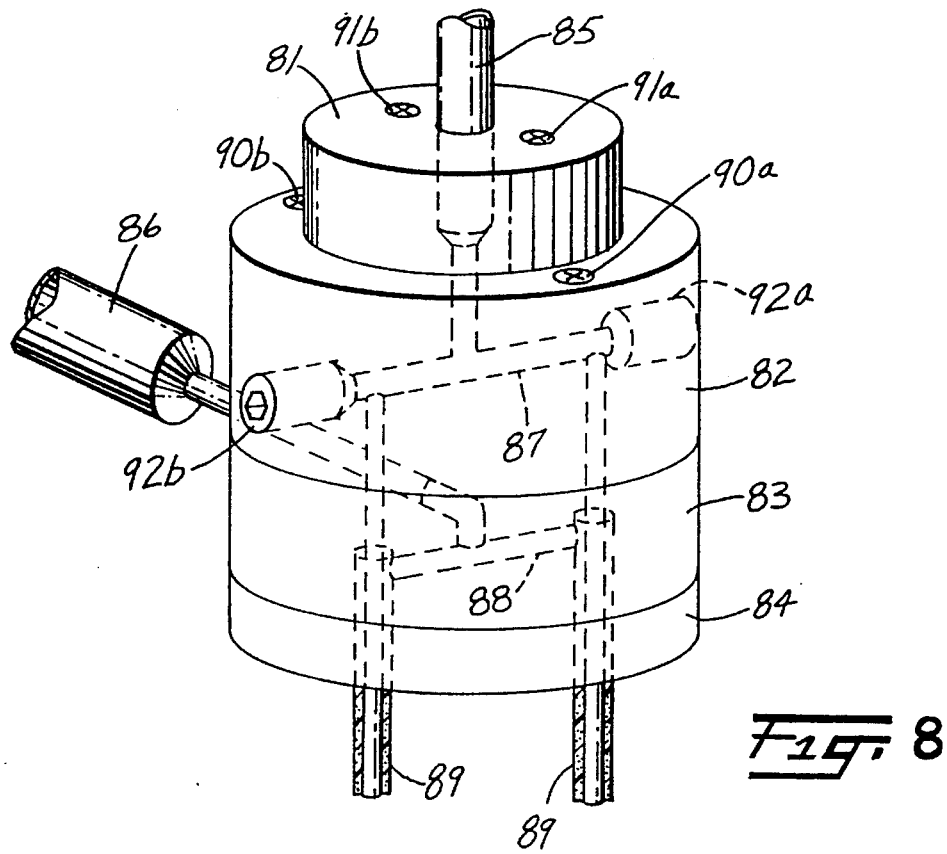
FIG. 8 is a perspective view of a filament extrusion die used to produce core-sheath abrasive filament embodiments within the invention.

Core-sheath abrasive filaments in accordance with the present invention are made by an extrusion process, which includes the use of at least two extruders, the outlet of each connected to a die such as that shown perspectively in FIG. 8. A first molten, organic polymeric material, comprising TPE or TP and adapted to form one filament component (or blend of TPE and TP) and a second molten organic polymeric material comprising TPE or TP, adapted to form the second elongate filament component, are extruded simultaneously through distinct first and second passages within the same die. The distinct passages force the first and second molten organic polymeric materials to assume the shape of first and second elongate filament components, in melt fusion adherent contact along a continuous surface of the first component, as one or more extrudates from the die.

Abrasive particles, along with optional coupling agents, fillers, pigments, and the like, are added to at least one of the first and second molten organic polymeric materials upstream of the die. One or more abrasive filament precursors are formed from the extrudate(s) by cooling the extrudate(s) (preferably by quenching in a cooling water bath or flowing stream of cooling water) to a temperature sufficient to harden the first and second molten organic polymeric materials. The abrasive filament precursors are then typically wound onto suitable cores by winding machines well known in the art, where they are held until cut into individual abrasive filaments.

Abrasive particles may also be applied to an abrasive filament precursor extrudate by projecting the abrasive grains toward the extrudate by force, such as electrostatic or mechanical force. Alternatively, the abrasive particles may be applied via a fluidized bed of the abrasive particles wherein the extrudate passes through the fluidized bed. However, the preferred method is wherein the first and second molten organic polymeric materials are passed through a die having abrasive particles already therein, and the extrudate cooled to form the abrasive filament precursors.

Figure 9:
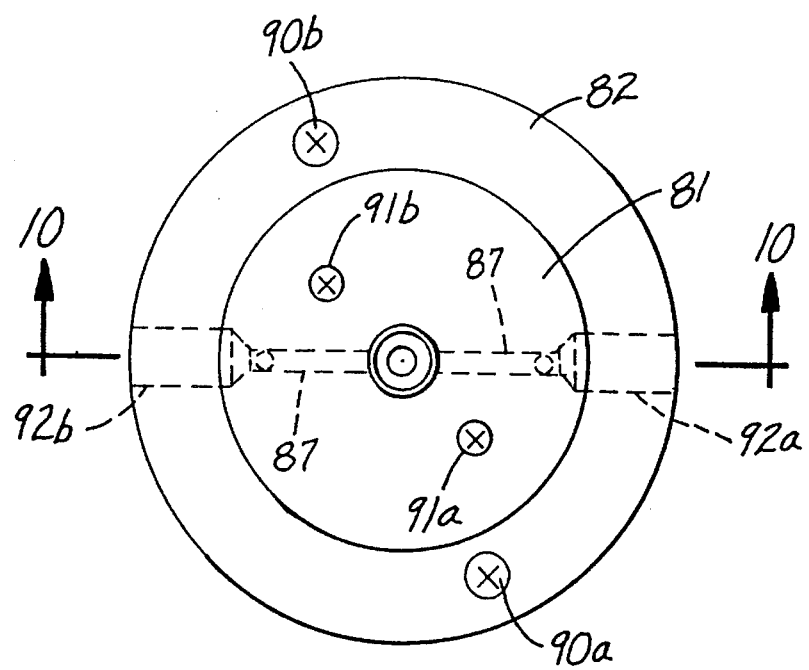
FIG. 9 is a plan view of the die shown in FIG. 8.
Figure 10:
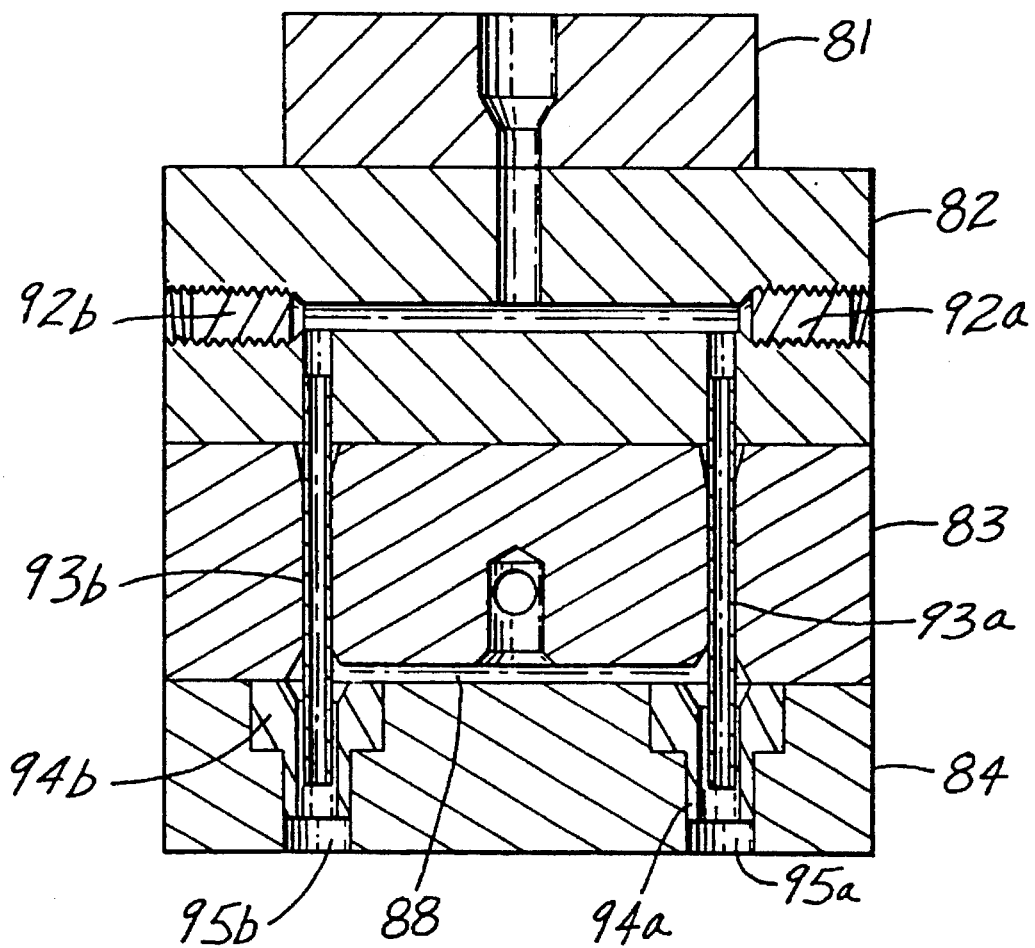
FIG. 10 is a cross-section of the die shown in FIGS. 8 and 9, taken along the line "10—10" of FIG. 9.

In the preferred method in accordance with the invention, a die such as that shown in FIGS. 8–10, is attached to the exit of at least two extruders, an extruder being one preferred technique of rendering the organic polymeric materials molten and mixing the abrasive particles therein. For each TPE the zone temperatures of the extruder and die temperature are preferably set at the temperatures commercially recommended for each TPE (see Table A), the main limitation being the melting or dissociation temperature of the hard domains or ionic clusters of the TPE. Preferred extruder zone and die temperatures are listed in Table A. The extruders (or other melt rendering means, such as heated vessels, and the like) preferably heat the organic polymeric materials above the hard domain or ionic cluster melting or dissociation temperature of the TPE employed (which may have a range that can change with type and grade of the TPE) and the melting temperature of TP employed (which may also have a temperature range) and push molten organic polymeric materials through a heated die such as shown in FIGS. 8–10.

Referring now specifically to FIGS. 8–10, FIG. 8 illustrates in perspective a die which may be used to make core-sheath abrasive filaments of the invention according to the above procedure, while FIG. 9 presents a plan view. An adapter plate 81 is attached via screws 91a and 91b to first stage plate 82, which is in turn connected to second and third stage plates 83 and 84 via bolts 90a and 90b. A conduit 85 allows molten organic material to flow into the die from a first extruder and through core passages denoted as 87. A second conduit 86 allows a second molten organic material to flow through passages 88 and thus form sheaths in extrudates 89. If abrasive filaments of the invention having no sheath are desired, no molten organic material is allowed to enter the die through conduit 86.

Referring to FIG. 10, plugs 92a and 92b are provided to direct flow of molten organic material into tubing inserts 93a and 93b (FIG. 10). Inserts 93a and 93b having a given internal diameter or shape may be easily removed and replaced with other inserts to control the shape and size of the core in core-sheath embodiments. Similarly, inserts 94a and 94b are provided to control the thickness of the sheath of the extrudates which exit the die from exit ports 95a and 95b.

Variations in structural details of dies such as that illustrated may vary. For example, more than two extrudates may be produced from a single die, and a plurality of dies may be employed in a manifold arrangement. For clarity, a die having structure for producing only two extrudates is illustrated in the figures herein. More than two bolts 90 a and b may be provided, as well as more than two screws 91 a and b. Further, bolts 90 preferably have helicoil type threading elements encasing the bolt shafts to allow high torque to be exerted on the bolts without damage to the stage plates. Also, an "electric blanket" type heating element is typically wrapped around the die to achieve and maintain the desired die temperature.

Abrasive particles may be added to the molten organic materials entering through conduits 85 or 86, or both, through feed ports of the extruders, preferably at points early enough to afford adequate dispersal of abrasive particles throughout the molten organic materials but not cause undue abrasion of the metallic parts of the extruders or dies. Alternatively, as noted previously, abrasive particles may be deposited on the molten organic polymeric via a second step (i.e. after forming the extrudate), such as by electrostatic coating.

A cold water quench is located downstream (preferably immediately downstream) of the die through which the extrudate passes to achieve rapid cooling of the molten organic polymeric materials to form an abrasive filament precursor comprising at least one TPE and abrasive particles.

TABLE A[1]

| EXTRUDER ZONE AND DIE TEMPERATURES, °C. | | | | | |
|---|---|---|---|---|---|
| Extrusion Zone[2] or die | 1 | 2 | 3 | 4 | die |
| TPE: | | | | | |
| Polyether | 230–250 | 230–250 | 230–250 | 230–250 | 230–250 |
| Ionomers | 225–250 | 225–250 | 225–250 | 225–250 | 225–250 |
| Polyether block amides | 170–230[3] | 170–230 | 170–230 | 170–230 | 170–230 |
| Polyurethanes | 170–190 | 180–195 | 195–215 | 205–225 | 190–210[4] |

[1]Data from Legge, et al.
[2]"1" corresponds to first heated zone, while "4" refers to the zone preceding the die.
[3]Lower temperature for the lower hardness, higher temperature for higher hardness grades.
[4]Higher temperature near zone 4, lower temperature near outlet of die.

The abrasive filament precursors can be oriented at draw ratios up to about 5:1 to increase the tensile strength of the resulting abrasive filaments of the invention; however, as this appears to drastically reduce the abrasion efficiency of the abrasive filaments (see Examples 29, 47, 49, 51, and 53), this is not preferred.

After the abrasive filament precursor has hardened it may have an optional coating (e.g. a plastic coating) applied thereover, for aesthetic, storage, or other purposes.

It should further be understood that the abrasive filaments and abrasive particles can contain fillers, lubricants, and grinding aids in levels typically used in the abrasives art.

More detailed descriptions of the method of fabricating core-sheath abrasive filament embodiments within the invention and methods of abrading flat steel plate workpieces, along with performance test results, are given in the Test Methods and Examples which follow.

EXAMPLES

The following examples are given as illustrations of the invention and are not intended as limitations thereof. In all examples, all parts and percentages are by weight unless otherwise stated. "P" refers to heat treated abrasive particles where used in conjunction with an abrasive particle designation, while the "grade" of abrasive particles refers to that used by the Grinding Wheel Institute (ANSI ASC B74.18-1984). "CRS" refers to "cold rolled steel", while "a-$Al_2O_3$-cer" refers to alpha-alumina-based ceramic abrasive particles. Workpiece removed and total filament weight loss values do not include initial 30 minutes breakin period.

Test Methods

Fatigue Failure Resistance

This test was used to evaluate fatigue failure of abrasive filaments, the results of which can be used to predict relative usable life of a brush made from the abrasive filaments of the invention. The test procedure used was published and described in Technical Bulletin No. 6, "Fatigue Resistance and Some of the Factors That Affect Flex Life of Brush Filling Materials", February, 1978, by du Pont, Plastic Products and Resins Department, Code # E-19743. The test procedure was followed exactly, with the exception that the filament holding device on the tester was changed to four chucks, each of which could be adjusted to firmly grasp one abrasive filament. In this test, the four chucks were affixed to a drive shaft, each of which was used to secure an individual abrasive filament or control filament. The chucks were mounted 90° apart with each being spaced 50 mm from the center of the drive shaft. The drive shaft was operated at 500 rpm. As per the test procedure, the interference between the filaments and the impact bar was adjusted, depending upon the filament diameter. For a 1.02 mm diameter filament, the interference was 12.22 mm; for 1.14 mm filament, the interference was 13.21 mm; for a 1.27 mm filament, the interference was 16.51; and for a 1.40 mm filament, the interference was adjusted to 18.16 mm. After securing four identical test filaments to the drive shaft, the drive shaft was rotated and the time required to cause 50% of the filaments to break was recorded. This value is reported in Table 7 for Examples 1–57 and Comparative Examples A–F.

Test Brush Construction

Abrasive filaments of the invention were used to form abrasive brushes of the invention by attaching one end of the abrasive filaments to a cast aluminum, machined, two-part hub.

The first part of the cast aluminum, machined hub consisted of a 5 mm thick aluminum disc having a 32 mm center hole, a 102 mm outside diameter, and had a raised square cross-sectional surface at the periphery that was raised 4 mm.

The second part of the cast aluminum hub was machined from a 19 mm thick cast aluminum disc, also having a 32 mm center hole with a 102 mm outside diameter. The second part of the cast aluminum hub was machined to be 5 mm thick, with the exception of three circular raised surfaces on one side of the disc, each concentric with the center hole: an outer, an intermediate, and an inner circular raised surface, all three raised circular surfaces parallel to the disc major surfaces. The outer circular raised surface had a square cross-section of 4 mm by 4 mm and an outside edge diameter of 102 mm. The intermediate circular raised surface had an outside edge diameter of 73 mm and an inside edge diameter of 68 mm, and was raised 13 mm above the disc major surface.

The annulus formed by one of the disc major surface and the intermediate raised surface was machined to produce eight equally sized and spaced bores extending radically through the annulus, each bore being 9 mm in diameter with the spacing between adjacent bores being about 3 mm. These bores defined holes into which abrasive filaments were subsequently placed. The inner circular, raised surface had an inside edge diameter of 32 mm which, when the two hub parts were mated, defined the center hole of the hub. The inner raised surface outer edge had a diameter (measured from the hub center) of 44 mm and was raised 13 mm above the disc major surface.

The inner raised surface and intermediate raised surface of the second hub disc defined the plane against which the first hub part was placed. The raised square cross sections of the first and second hub parts opposed each other.

One end of approximately 500 to 2000 abrasive filaments, each about 83 mm long, were placed into each of the eight bores. Sufficient number of filaments were place in each bore to essentially fill each bore. A two-part epoxy adhesive liquid resin composition (combination of the epoxy "Epi-Rez" WD-510, from Rhone-Poulenc, and the amine "Jeffamine" D-230, available from Texaco Chemical Company, Bellaire, Tex.) was placed over the filament end which protruded into the bore. The first part of the machined aluminum hub was secured to the second part using four screws, 4 mm in diameter, through four holes equally spaced 42 mm from the center of the machined aluminum hub. This caused the abrasive filaments to slightly fan out with a resultant filament trim length of about 50 mm. After being held for approximately 24 hours at room temperature (about 25° C., to allow the epoxy resin to harden) the abrasive filament brushes were ready for subsequent evaluations. The brushes had a 32 mm center hole and approximately 200 mm outside diameter.

Flat Plate Abrasion Tests

Abrasive filament brushes, fabricated as just described for each of the 57 Example abrasive filaments and Comparative Examples A–F, were weighed and separately mounted on a shaft connected to a 2.24 Kw (3 hp) motor which operated at 1750 rpm. 1018CRS steel plates, 100 mm square by approximately 6 mm thick, were weighed and then brought in contact with each brush with a force of 13.3 Pa. At 15 minute intervals, the test brushes and steel plates were again weighed to determine the weight loss of the steel plates and weight loss of the test brushes. After 8 test periods (120 minutes) the tests were concluded and the total cut (steel plate weight loss) was calculated. This value was divided by 2 to give average grams cut per hour by each brush. The efficiency ($\eta$) of the brushes was calculated by dividing the total plate weight loss by the total abrasive filament weight loss. Results are reported in Tables 2–6.

Abrasive Filament Tensile Strength

Abrasive filaments of the invention were evaluated for their tensile strength by measuring the force required to break a 100 mm long abrasive filament grasped at each end by one of two jaws of a standard tensile tester (known under the trade designation "Sintech 2"), where the jaws were initially spaced 25 mm apart and then separated at the rate of 50 mm a minute. The force required to break each filament was noted and recorded as kilograms force required, and reported in Table 7.

Abrasive Filament Extrusion 57 abrasive filaments made in accordance with this invention were prepared by the melt extrusion process. A twin screw extruder fitted with two 30 mm diameter co-rotating screws having an L/D ratio of 30:1 (model ZSK-30, from Werner-Pfleiderer), was employed in each case, along with a second single screw extruder (from C. W. Brabender, having 1.78 cm diameter barrel, 30:1 L/D ratio). The thermoplastic elastomers employed were first rendered molten by the twin screw extruder (using zone and die temperatures in Table A above for each TPE), whereupon abrasive particles were controllably added through a feed port of the extruder barrel.

The extrusion die used was similar to that illustrated in FIG. 8–10, but was equipped to provide 4 extrudates, rather than 2 as shown in the figures. After exiting the extrusion die, the extrudates were cooled by causing the extrudates to pass through a water stream placed about 150 mm from the exit ports, after which the abrasive filament precursors were wound onto the same windup roll (separate windup rolls could also be used). Abrasive filaments were subsequently cut from the roll. It is important to note that none of the coated filaments produced by the above method required orienting prior to being accumulated on the roll, subsequent cutting into filaments, and fabrication into brush devices, although some abrasive filament precursors were oriented at a draw ratio of 3:1 to compare abrasive performance with undrawn samples. (A draw ratio of 3:1 means the final length was about 3 times the original length.)

The TPEs employed, including some of their physical properties, are listed in Table 1. Tables 2–6 lists TPE, abrasive particle type, size, etc., used in each Example filament, along with abrasion test data. Table 7 lists mechanical properties (force to break, fatigue failure resistance) of the control filaments and abrasive filaments of the invention. The abrasive particle content in each filament was determined by using a standard thermal burnoff technique.

Four abrasive-filled nylon control filaments A–F were used to compare with Examples 1–57. The composition of the control filaments is indicated in the Tables. Comparative Example filaments A–D were commercially available (under the trade designation "TYNEX") from du Pont. Comparative Example filaments E and F were made by the inventors herein.

TABLE 1

| TPE | Manufacturer | Shore D Hardness |
|---|---|---|
| "Hytrel 5526", a polyester TPE | du Pont | 55 |
| "Hytrel 5556", a polyester TPE | du Pont | 55 |
| "Hytrel 6356", a polyester TPE | du Pont | 63 |
| "Hytrel 7246", a polyester TPE | du Pont | 72 |
| "Hytrel 8238" a polyester TPE, | du Pont | 82 |
| "Surlyn 8550", an ionomeric co-polymer of ethylene and methacrylic acid partial sodium salt | du Pont | 60 |
| "Pebax 5500", polyamide TPE | Atochem Group - Elf Aquitaine | 55 |
| "Pebax 6300", polyamide TPE | Atochem Group - Elf Aquitaine | 63 |
| "Pebax 7000", polyamide TPE | Atochem Group - Elf Aquitaine | 70 |
| "Estane 58409", a polyester polyurethane TPE | B.F. Goodrich | 48 |
| "Estane 58810:, a polyester polyurethane TPE | B.F. Goodrich | 42 |
| "Lomod B0520:, a polyester TPE | General Electric Co. | 70 |
| "Polybutene 8340:" | Shell Chemical Co. | 50 |

TABLE 2

(1800 RPM)

| Brush Example, number of filaments | Filament composition[1] Sheath | Core | workpiece removed, (gms/hr) | total filament weight loss (gms/hr) | Efficiency |
|---|---|---|---|---|---|
| 1, 1227 | "Hytrel 6356" | "Hytrel 6356" + P120 Al$_2$O$_3$ | 0.70 | 0.19 | 3.68 |
| 2, 1720 | " | "Hytrel 6356" + | 1.08 | 0.29 | 3.72 |
| 3, 1793 | " | "Hytrel 6356" + | 2.00 | 0.19 | 10.5 |
| 4, 1450 | " | "Hytrel 6356" + a-Al$_2$O$_3$-cer | 3.33 | 0.23 | 14.5 |
| 5, 1101 | " | "Hytrel 6356" + | 2.99 | 0.43 | 6.95 |
| 6[2], 981 | " | "Hytrel 6356" + | 2.16 | 0.24 | 9.00 |
| 7[3], 1060 | " | "Hytrel 6356" + | 5.09 | 0.17 | 29.9 |
| 8, 1953 | "Lomod B0520" | "Lomod BO520" + P120 Al$_2$O$_3$ | 1.60 | 0.20 | 8.00 |
| A, 1193 | none | "nylon 6, 12 + 80 Sic | 0.34 | 0.25 | 1.36 |
| B, 1640 | none | "nylon 6, 12 + 180 SiC | 0.16 | 0.19 | 0.84 |
| C, 1576 | none | "nylon 6, 12 + 180 Al$_2$O$_3$ | 0.60 | 0.12 | 0.50 |

[1]wt. % abrasive (% of core wt.) was as follows:
Example 1 = about 35;
Example 2 = 30;
Example 3 = 45;
Example 4 = 16;
Examples 5–7 = 30;
Example 8 = 45;
Examples A, B, C, = 30.
Cross-sectional area of abrasive component (% of total) was as follows:
Example 1        about 70–80%;
Examples 2, 3    80–90%;
Example 4        70–80%;
Examples 5–7     70–80%;
Example 8        80–90%;
Examples A–C     100%.
[2]This core included 0.2 wt. % (of core wt.) the coupling agent neopentyl(diallyl)oxy,-tri(dioctyl)phosphato titanate
[3]This core included 0.2 wt. % (of core wt.) coupling agent neopentyl(diallyl)oxy,tri(m-amino)phenyl titanate

TABLE 3

(1800 RPM)

| Brush, Example number of filaments | Filament composition[1] Sheath | Core | workpiece removed, (gms/hr) | total filament weight loss (gms/hr) | Efficiency |
|---|---|---|---|---|---|
| 9, 1762 | "Hytrel 8238" | "Hytrel 8238" + P120 Al$_2$O$_3$ | 2.17 | 0.33 | 6.58 |
| 10, 1658 | "Hytrel 6356" | "Hytrel 6356" + | 1.64 | 0.33 | 4.97 |
| 11, 1673 | " | "Hytrel 6356" + P180 Al$_2$O$_3$ | 0.50 | 0.28 | 1.79 |
| 12, 1635 | " | "Hytrel 6356" + 180 SiC | 1.50 | 0.35 | 3.00 |
| 13, 1567 | "Hytrel 7246" | "Hytrel 7246" + P120 Al$_2$O$_3$ | 1.95 | 0.23 | 8.48 |
| 14, 1622 | " | "Hytrel 7246" + P180 Al$_2$O$_3$ | 0.61 | 0.42 | 1.45 |
| 15, 1555 | " | "Hytrel 7246" + 180 Al$_2$O$_3$ | 0.42 | 0.14 | 3.00 |
| 16, 1610 | "Hytrel 6356" | "Hytrel 6356" + 120 Al$_2$O$_3$ | 1.10 | 0.31 | 3.55 |
| 17, 1592 | " | "Hytrel 6356" + 120 Sic | 1.75 | 0.21 | 8.33 |
| 18, 1375 | polypropylene | " | 0.76 | 0.46 | 1.65 |
| 19, 1485 | nylon 12, 12 | " | 0.63 | 0.19 | 3.32 |
| 20, 1030 | "Hytrel 6356" | "Hytrel 6356" + 80 Al$_2$O$_3$ | 1.01 | 0.22 | 4.59 |
| D, 1176 | none | nylon 6, 12 + 80 SiC | 0.32 | 0.13 | 2.46 |

[1]wt. % abrasive (% of core weight) was as follows:
Example 9 = 38;
Examples 10–12 = 44;
Examples 13–20 = 35.
% cross-sectional area of core to toal cross-sectional area:

TABLE 3-continued

(1800 RPM)

| Brush, Example number of filaments | Filament composition[1] | | workpiece removed, (gms/hr) | total filament weight loss (gms/hr) | Effi- ciency |
|---|---|---|---|---|---|
| | Sheath | Core | | | |
| Example 9 | 70–80% | | | | |
| Examples 10–14 | 80–90 | | | | |
| Examples 15–16 | " | | | | |
| Example 17 | " | | | | |
| Example 18 | " | | | | |
| Example 19 | " | | | | |
| Example 20 | " | | | | |

TABLE 4

(1800 RPM)

| Brush, Example number of filaments | Filament composition[1] | | workpiece removed, (gms/hr) | total filament weight loss (gms/hr) | Effi- ciency |
|---|---|---|---|---|---|
| | Sheath | Core | | | |
| 21, 1435 | "Hytrel 5526" | "Hytrel 8238" + P120 $Al_2O_3$ | 2.33 | 4.40 | 0.53 |
| 22, 1095 | "Polybutene 8340" | "Polybutene 8340" + P120 $Al_2O_3$ | 0.87 | 0.11 | 7.91 |
| 23, 1517 | "Hytrel 6356" | "Hytrel 6356" + 120 cer. | 3.21 | 0.34 | 9.44 |
| 24, 881 | none | "Hytrel 6356" + P120 $Al_2O_3$ | 1.01 | 0.20 | 5.05 |
| 25, 917 | none | " | 1.18 | 0.27 | 4.37 |
| 26, 936 | "Hytrel 5526" + 180 SiC | " | 0.56 | 0.28 | 2.00 |
| 27, 1658 | "Hytrel 5526" + 120 SiC | " | 0.93 | 0.51 | 1.82 |
| 28, 646 | "Hytrel 6356" + P120$AL_2O_3$ | "Hytrel 6356" | 0.99 | 0.36 | 2.75 |
| 29[2], 656 | " | " | 0.29 | 0.72 | 0.40 |
| 30, 1355 | " | " | 1.21 | 0.22 | 5.50 |
| 31, 730 | " | " | 0.87 | 0.33 | 2.64 |
| 32, 545 | " | " | 0.81 | 0.36 | 2.25 |
| 33, 1232 | "Hytrel 7246" + P120$AL_2O_3$ | " | 1.43 | 0.18 | 7.94 |
| 34, 1385 | 50/50 "Hytrel 7246, 8238" + P120$AL_2O_3$ | " | 1.31 | 0.28 | 4.68 |
| 35, 1250 | " | " | 2.55 | 0.34 | 7.50 |
| 36, 1485 | "Hytrel 5526" + P120 $Al_2O_3$ | 50/50 "7246/8238" | 1.19 | 0.22 | 5.41 |
| 37, 1265 | " | " | 1.23 | 0.20 | 6.15 |
| 38, 1147 | " | " | 1.37 | 0.27 | 5.07 |
| 39, 1112 | " | " | 1.36 | 5.43 | 0.25 |
| 40, 1208 | " | nylon 12, 12 | 0.89 | 0.23 | 3.87 |
| 41, 1022 | "Hytrel 7246" + P120 $Al_2O_3$ | " | 0.94 | 0.23 | 4.09 |
| 42, 1251 | "Hytrel 6356" + P120 $Al_2O_3$ | " | 0.75 | 0.18 | 4.17 |
| 43, 1466 | "Hytrel 6356" | "Hytrel 6356" + P120$Al_2O_3$ | 1.12 | 0.18 | 6.22 |
| 44, 1295 | nylon 12, 12 | " | 0.56 | 0.17 | 3.29 |
| 45, 1545 | "Hytrel 5526" | "Hytrel 5526" + P120$Al_2O_3$ | 1.56 | 0.24 | 6.50 |

[1] wt. % abrasive in abrasive layer (% of total layer wt.) was as follows:
Examples 21–22 = 35%
Example 23    50
Example 24    30
Example 25    40
Examples 26–27  30
Examples 28–29  25
Examples 30–32  35
Example 33    55
Example 34    25
Example 35    30
Example 36    25
Example 37    30
Example 38    35
Example 39    40
Examples 40–42  30
Examples 43–45  35

[2] Tensilized at 3:1 draw ratio

TABLE 5

(1800 RPM)

| brush Example, number of filaments | filament composition[1] sheath | core | workpiece removed, (gms/hr) | total filament weight loss (gms/hr) | Efficiency |
|---|---|---|---|---|---|
| 46, 725 | "Hytrel 8238" + P120 $Al_2O_3$ | "Hytrel 6356" | 1.07 | 0.40 | 2.68 |
| 47*, 977 | " | " | 0.26 | 0.89 | 0.29 |
| 48, 767 | "Hytrel 6356" + 120 SiC | 1:1 "Hytrel 8238" "Hytrel 6356" | 0.76 | 0.42 | 1.81 |
| 49*, 1126 | " | " | 0.45 | 0.69 | 0.65 |
| 50, 756 | "Hytrel 6356" + P120 $Al_2O_3$ | " | 0.85 | 0.32 | 2.66 |
| 51*, 1281 | " | " | 0.58 | 1.49 | 0.39 |
| 52, 675 | "Hytrel 7246" + P120 $Al_2O_3$ | "Hytrel 6356" | 1.10 | 0.33 | 3.33 |
| 53*, 1317 | " | " | 0.65 | 0.55 | 1.18 |
| E, 1079 | nylon 12, 12 + 180 SiC | nylon 12, 12 | 0.22 | 0.16 | 1.38 |
| F*, 1021 | nylon 12 + 180 SiC | " | 0.09 | 0.55 | 0.16 |

*tensilized (drawn) at a 3:1 draw ratio
[1]weight percent abrasive in each case about 30–40 wt % of sheath

TABLE 6

(4200 RPM)

| brush Example, number of filaments | filament composition[1] sheath | core | workpiece removed, (gms/hr) | total filament weight loss (gms/hr) | Efficiency |
|---|---|---|---|---|---|
| 54, 1328 | "Hytrel 6356" + P120 $Al_2O_3$ | "Hytrel 6356" | 9.64 | 1.56 | 6.18 |
| 55, 1320 | " | " | 13.72 | 1.92 | 7.14 |
| 56, 1295 | nylon 12, 12 | "Hytrel 6356" + P120$Al_2O_3$ | 28.8 | 3.28 | 8.78 |
| 57, 2155 | " | " | 29.6 | 2.40 | 12.3 |

Example weight percent abrasive:
Example 56 = 25–30,
Example 57 = 35–40,
Example 58 = 35–40,
Example 59 = 35–40.

TABLE 7

| Example | Fatigue[1] Test, min | Filament Diameter, mm | Force to Break, kg |
|---|---|---|---|
| 1 | >120 | 1.0 | 1.36 |
| 2 | >120 | 1.08 | — |
| 3 | >120 | 1.08 | — |
| 4 | >120 | 1.13 | 2.40 |
| 5 | >120 | 1.31 | 2.67 |
| 6 | >120 | 1.31 | 3.35 |
| 7 | >120 | 1.31 | 3.35 |
| 8 | >120 | 0.96 | — |
| 9 | <1 | 1.01 | — |
| 10 | >120 | 1.08 | — |
| 11 | >120 | 1.08 | — |
| 12 | >120 | 1.08 | — |
| 13 | <4 | 1.08 | — |
| 14 | <3 | 1.08 | — |
| 15 | <2 | 1.06 | — |
| 16 | >120 | 1.06 | — |
| 17 | >120 | 1.08 | — |
| 18 | <1 | 1.26 | — |
| 19 | >120 | 1.13 | — |
| 20 | >120 | 1.39 | — |
| 21 | <1 | 1.17 | 1.77 |
| 22 | >120 | 1.19 | 2.36 |
| 23 | <5 | 1.14 | 1.04 |
| 24 | >120 | 1.39 | 2.98 |
| 25 | >120 | 1.39 | 2.58 |
| 26 | >120 | 1.39 | 3.22 |
| 27 | >120 | 1.22 | 2.40 |
| 28 | >120 | 1.85 | 3.22 |
| 29* | >120 | 1.75 | 6.50 |
| 30 | >120 | 1.02 | — |
| 31 | >120 | 1.52 | — |
| 32 | >120 | 1.78 | — |
| 33 | <2 | 1.29 | 3.08 |
| 34 | <3 | 1.24 | — |
| 35 | <2 | 1.27 | 1.90 |
| 36 | >120 | 1.17 | — |
| 37 | 22 | 1.27 | 1.45 |
| 38 | 20 | 1.39 | — |
| 39 | <5 | 1.47 | — |

[1]Fatigue resistance test, time for 50% of filaments to fail (test described above under "Test Methods");
">" means "greater than", "<" means "less than".

TABLE 7-continued

| | | | |
|---|---|---|---|
| 40 | >120 | 1.39 | — |
| 41 | <6 | 1.42 | — |
| 42 | >120 | 1.35 | 1.95 |
| 43 | >120 | 1.22 | 1.59 |
| 44 | >120 | 1.19 | 2.13 |
| 45 | >120 | 1.14 | 1.54 |
| 46 | 30 | 1.62 | 2.60 |
| 47* | >120 | 1.35 | 6.50 |
| 48 | >120 | 1.67 | 3.27 |
| 49* | >120 | 1.50 | 4.18 |
| 50 | >120 | 1.68 | 3.23 |
| 51* | >120 | 1.24 | 5.09 |
| 52 | 23 | 1.61 | 3.86 |
| 53* | 60 | 1.31 | 4.91 |
| 54 | >120 | 1.24 | — |
| 55 | >120 | 1.35 | — |
| 56 | >120 | 1.19 | — |
| 57 | >120 | 0.96 | — |
| A | 15 | 1.27 | 11.3 |
| B | 13 | 1.14 | 11.3 |
| C | 16 | 1.14 | 11.3 |
| D | 13 | 1.27 | 11.3 |
| E | >120 | 1.34 | 2.77 |
| F* | >120 | 1.52 | 7.23 |

*Tensilized at 3:1 draw ratio

Discussion of Results

Efficiency

In general, brushes including abrasive filaments of the invention were more efficient than brushes employing control filaments, with the exception of Examples 11, 14, 18, 21, 26, 27, 29, 32, 39, 47–49, 51, and 53. The examples not exceeding the highest efficiency achieved for the controls ($\eta$=2.46 for control filament D) may be explained as follows.

Brushes including example filaments 11 and 14 used much smaller abrasive particle size than did Control filament D (P180 $Al_2O_3$ vs. 80 SiC).

The brush including example filament 18, using a polypropylene sheath with a polyester TPE core including 120 SiC, although not as efficient as control filament D, was more efficient than brushes employing control filaments A–C.

The brushes containing filaments of Example 21 exhibited chipping of the core due to the presence of the polyester TPE "Hytrel 8238". The brush employing Example filaments 26 used 180 grade SiC abrasive particles, which tended to be less aggressive. The brush using Example filaments 27 used a softer grade of polyester TPE ("Hytrel 5526") but still outperformed Control filaments A, B, and C.

Brushes containing Example filaments 29, 47, 49, 51, and 53, all tensilized at a draw ratio of 3:1, exhibited lower abrasion efficiency.

The brush containing Example filament 32 had only 545 filaments. Similarly, the brush having Example filament 39 had the lowest amount of filaments of the brushes of Examples 36–39, all other conditions being equal.

The brush including Example filaments 48 had about 35% less filaments than control Example D.

Mechanical Properties

Example abrasive filaments of the invention had better flex fatigue resistance than the controls (Control C had 16 minutes for 50% failure), except for Examples 9, 13, 14, 18, 21, 23, 33–35, 39, and 41. These Example filaments all had higher abrasive particle loadings than the control filaments. The force to break was much higher for tensilized filaments (Examples 29, 47, 49, 51, and 53) of the invention, but the efficiency values dropped significantly for those filaments, so that tensilizing of the filaments is not preferred if optimum abrasion efficiency is desired. A balance must be struck between tensile strength (force to break/filament diameter) and abrasion efficiency, which can be determined without undue experimentation according to the above teachings.

Various modifications and alterations of this invention will become apparent to those skilled in the art without departing from the scope and spirit of this invention, and it should be understood that this invention is not to be unduly limited to the illustrated embodiments set forth herein.

What is claimed is:

1. An extruded, unoriented abrasive filament comprising
   (a) said first elongate filament component having a continuous surface throughout its length and comprising a first hardened organic polymeric material; and
   (b) a second elongate filament component coterminous with said first elongate filament component, said second elongate filament component comprising of a second hardened organic polymeric material in melt fusion adherent contact with said first elongate filament component along said continuous surface, the second hardened organic polymeric material being the same or different than the first hardened organic polymeric material,
   wherein at least one of the first and second hardened organic polymeric materials comprises a thermoplastic elastomer, the thermoplastic elastomer having abrasive particles dispersed and adhered therein.

2. An abrasive filament in accordance with claim 1 wherein said thermoplastic elastomer is segmented.

3. An abrasive filament in accordance with claim 2 wherein said segmented thermoplastic elastomer is selected from the group consisting of segmented polyesters, segmented polyurethanes, segmented polyamides, and mixtures thereof.

4. An abrasive filament in accordance with claim 1 wherein said abrasive particles are individual abrasive grains.

5. An abrasive filament in accordance with claim 4 wherein said individual abrasive grains are selected from the group consisting of silicone carbide, aluminum oxide, alumina zirconia, cubic boron nitride, garnet, pumice, sand, emery, mica, corundum, quartz, diamond, boron carbide, alpha alumina-based ceramic material, and combinations thereof.

6. An abrasive filament in accordance with claim 4, wherein said abrasive grains are selected from the group consisting of aluminum oxide, silicone carbide, and alpha alumina-based ceramic materials, said first thermoplastic elastomer comprises from about 0.1 to about 65 weight percent of abrasive grains.

7. An abrasive filament in accordance with claim 1 having a filament cross sectional area, wherein said first elongate filament component comprises a core having a core cross-sectional area and said first hardened organic polymeric material comprises a first thermoplastic elastomer, and wherein said second elongate filament component comprises a sheath having a sheath cross-sectional area.

8. An abrasive filament in accordance with claim 1, wherein said first elongate filament component comprises a core and said first hardened organic polymeric material comprises a polymer selected from the group consisting of segmented polyesters, segmented polyurethanes, segmented polyamides and mixtures thereof.

9. An abrasive filament in accordance with claim 7, wherein said second hardened organic polymeric material comprises a second thermoplastic elastomer which is the same or different from said first thermoplastic elastomer.

10. An abrasive filament in accordance with claim 9, wherein said first thermoplastic elastomer is different from said second thermoplastic elastomer and each thermoplastic elastomer is selected from the group consisting of segmented polyesters, segmented polyurethanes, segmented polyamides and mixtures thereof.

11. An abrasive filament in accordance with claim 1, wherein the first hardened organic polymeric material comprising abrasive particles and said first thermoplastic elastomer further includes a coupling agent.

12. An abrasive element in accordance with claim 11 wherein the coupling agent is a titanate.

13. An abrasive filament in accordance with claim 1 wherein said first thermoplastic elastomer has a Shore D durometer hardness ranging from about 30 to 90.

14. An abrasive filament in accordance with claim 7 wherein the ratio of the cross sectional area of the sheath to the cross sectional area of the core ranges from about 1:1 to about 20:1, the cross sectional areas defined by a plane perpendicular to the abrasive filament major axis.

15. An abrasive filament in accordance with claim 7 wherein the cross sectional area of the sheath is at least about 40% of the cross sectional area of the abrasive filament, the cross sectional area defined by a plane perpendicular to the abrasive filament major axis.

16. An abrasive filament comprising:
   (a) a core having a continuous surface throughout its length and consisting essentially of a first thermoplastic elastomer, the first thermoplastic elastomer having abrasive particles dispersed and adhered therein; and
   (b) a sheath coterminous with the core, the sheath consisting essentially of a blend of a second thermoplastic elastomer and a thermoplastic polymer, the blend in melt fusion adherent contact with the core along the continuous surface.

17. Abrasive filament in accordance with claim 16 wherein the first thermoplastic elastomer is a first segmented thermoplastic elastomer, and the second thermoplastic elastomer is a second segmented thermoplastic elastomer.

18. Abrasive filament in accordance with claim 17 wherein the first and the second segmented thermoplastic elastomers are independently selected from the group consisting of segmented polyester thermoplastic elastomers, segmented polyurethane thermoplastic elastomers, and a segmented polyamide thermoplastic elastomers.

19. An abrasive filament comprising:
   (a) a core having a continuous surface throughout its length and consisting essentially of a blend of a first thermoplastic elastomer and a thermoplastic polymer; and
   (b) a sheath coterminous with the core, the sheath consisting essentially of a second thermoplastic elastomer polymer in melt fusion adherent contact with the core along the continuous surface, the second thermoplastic elastomer having abrasive particles dispersed and adhered therein.

20. Abrasive filament in accordance with claim 19 wherein the first thermoplastic elastomer is a first segmented thermoplastic elastomer, and the second thermoplastic elastomer is a second segmented thermoplastic elastomers.

21. Abrasive filament in accordance with claim 20 wherein the first and the second segmented thermoplastic elastomers are independently selected from the group consisting of segmented polyester thermoplastic elastomers, segmented polyurethane thermoplastic elastomers, and segmented polyamide thermoplastic elastomers.

* * * * *